(12) United States Patent
Hall et al.

(10) Patent No.: US 7,729,297 B2
(45) Date of Patent: Jun. 1, 2010

(54) NEIGHBOR NODE BUS GUARDIAN SCHEME FOR A RING OR MESH NETWORK

(75) Inventors: Brendan Hall, Eden Prairie, MN (US); Kevin R. Driscoll, Maple Grove, MN (US)

(73) Assignee: Honeywell International Inc., Morristown, NJ (US)

( * ) Notice: Subject to any disclaimer, the term of this patent is extended or adjusted under 35 U.S.C. 154(b) by 1358 days.

(21) Appl. No.: 10/993,936

(22) Filed: Nov. 19, 2004

(65) Prior Publication Data

US 2005/0198280 A1   Sep. 8, 2005

Related U.S. Application Data

(60) Provisional application No. 60/523,892, filed on Nov. 19, 2003, provisional application No. 60/523,865, filed on Nov. 19, 2003.

(51) Int. Cl.
*H04L 12/437* (2006.01)
*H04L 12/43* (2006.01)

(52) U.S. Cl. ...................... 370/258; 370/404

(58) Field of Classification Search ................ 370/216, 370/221–228, 254, 255, 258, 389, 390, 400, 370/404; 709/239
See application file for complete search history.

(56) References Cited

U.S. PATENT DOCUMENTS

| | | | |
|---|---|---|---|
| 4,417,334 A | 11/1983 | Gunderson et al. | |
| 4,428,046 A | 1/1984 | Chari et al. | |
| 4,630,254 A | 12/1986 | Tseng | |
| 4,631,718 A | 12/1986 | Miyao | |
| 4,733,391 A | 3/1988 | Godbold et al. | |
| 4,740,958 A | 4/1988 | Duxbury et al. | |
| 4,856,023 A | 8/1989 | Singh | |

(Continued)

FOREIGN PATENT DOCUMENTS

AT      407582 B      4/2001

(Continued)

OTHER PUBLICATIONS

Al-Rousan et al., "The Two-Processor Reliability of Hierarchical Larg-Scale Ring-Based Networks", "Proceedings of the 29th Hawaii International Conference on System Sciences", 1996, pp. 63-71.

(Continued)

*Primary Examiner*—Pankaj Kumar
*Assistant Examiner*—Saba Tsegaye
(74) *Attorney, Agent, or Firm*—Fogg & Powers LLC

(57) ABSTRACT

In one embodiment, a node comprises an interface to communicatively couple the node to a channel. The channel communicatively couples the node to a first neighbor node in a first direction and to a second neighbor node in a second direction. When the first neighbor node is scheduled to transmit and the node receives data from the first neighbor node via the channel, the node determines if the transmission of the data complies with a policy. When the transmission of the data does not comply with the policy, the node does at least one of: blocks the data from being relayed along the channel and relays the data along the channel with information indicating that the transmission of the data does not comply with the policy.

53 Claims, 17 Drawing Sheets

U.S. PATENT DOCUMENTS

| | | | |
|---|---|---|---|
| 4,866,606 A | 9/1989 | Kopetz | |
| 4,905,230 A | 2/1990 | Madge et al. | |
| 5,132,962 A | 7/1992 | Hobgood et al. | |
| 5,161,153 A | 11/1992 | Westmore | |
| 5,235,595 A | 8/1993 | O'Dowd | |
| 5,257,266 A | 10/1993 | Maki | |
| 5,307,409 A | 4/1994 | Driscoll | |
| 5,341,232 A | 8/1994 | Popp | |
| 5,383,191 A | 1/1995 | Hobgood et al. | |
| 5,386,424 A | 1/1995 | Driscoll et al. | |
| 5,394,401 A | 2/1995 | Patrick et al. | |
| 5,463,634 A | 10/1995 | Smith et al. | |
| 5,557,778 A | 9/1996 | Vaillancourt | |
| 5,687,356 A | 11/1997 | Basso et al. | |
| 5,715,391 A * | 2/1998 | Jackson et al. | 712/11 |
| 5,896,508 A | 4/1999 | Lee | |
| 5,903,565 A | 5/1999 | Neuhaus et al. | |
| 5,920,267 A * | 7/1999 | Tattersall et al. | 370/258 |
| 5,937,414 A | 8/1999 | Souder et al. | |
| 5,940,367 A | 8/1999 | Antonov | |
| 6,052,753 A | 4/2000 | Doerenberg et al. | |
| 6,172,984 B1 | 1/2001 | Beyda et al. | |
| 6,175,553 B1 | 1/2001 | Luk et al. | |
| 6,219,528 B1 * | 4/2001 | Wright et al. | 455/13.4 |
| 6,226,676 B1 | 5/2001 | Crump et al. | |
| 6,374,078 B1 | 4/2002 | Williams et al. | |
| 6,414,953 B1 | 7/2002 | Lamarche et al. | |
| 6,513,092 B1 | 1/2003 | Gorshe | |
| 6,594,802 B1 | 7/2003 | Ricchetti et al. | |
| 6,618,359 B1 | 9/2003 | Chen et al. | |
| 6,707,913 B1 | 3/2004 | Harrison et al. | |
| 6,741,559 B1 | 5/2004 | Smeulders et al. | |
| 6,760,768 B2 | 7/2004 | Holden et al. | |
| 6,765,924 B1 | 7/2004 | Wu et al. | |
| 6,842,617 B2 | 1/2005 | Williams et al. | |
| 6,925,497 B1 | 8/2005 | Vetrivelkumaran et al. | |
| 6,956,461 B2 | 10/2005 | Yoon et al. | |
| 7,035,539 B2 | 4/2006 | Gumaste | |
| 7,050,395 B1 | 5/2006 | Chow et al. | |
| 7,085,560 B2 | 8/2006 | Petermann | |
| 7,088,921 B1 | 8/2006 | Wood | |
| 7,269,177 B2 | 9/2007 | Baker | |
| 7,349,414 B2 | 3/2008 | Sandstrom | |
| 7,457,303 B2 | 11/2008 | Blumrich et al. | |
| 2002/0027877 A1 | 3/2002 | Son et al. | |
| 2002/0087763 A1 | 7/2002 | Wendorff | |
| 2002/0118636 A1 | 8/2002 | Phelps et al. | |
| 2003/0002435 A1 * | 1/2003 | Miller | 370/217 |
| 2003/0067867 A1 | 4/2003 | Weis | |
| 2003/0128984 A1 * | 7/2003 | Oberg et al. | 398/83 |
| 2004/0073698 A1 * | 4/2004 | Harter et al. | 709/236 |
| 2004/0223515 A1 | 11/2004 | Rygielski et al. | |
| 2004/0258097 A1 | 12/2004 | Arnold et al. | |
| 2005/0002332 A1 | 1/2005 | Oh | |
| 2005/0132105 A1 | 6/2005 | Hall et al. | |
| 2005/0169296 A1 | 8/2005 | Katar et al. | |
| 2006/0077981 A1 | 4/2006 | Rogers | |
| 2006/0203851 A1 | 9/2006 | Eidson | |

FOREIGN PATENT DOCUMENTS

| | | |
|---|---|---|
| DE | 3238692 | 4/1984 |
| DE | 19633744 | 2/1998 |
| DE | 20220280 | 11/2003 |
| EP | 0405706 | 2/1990 |
| EP | 1280024 | 1/2003 |
| EP | 1280312 | 1/2003 |
| EP | 1365543 | 11/2003 |
| EP | 1398710 | 3/2004 |
| EP | 1469627 | 10/2004 |
| GB | 2028062 | 2/1980 |
| GB | 1581803 | 12/1980 |
| GB | 2175775 | 12/1986 |
| WO | 0064122 | 10/2000 |

OTHER PUBLICATIONS

"Backplane Data Bus ARINC Specification 659", Dec. 1993, pp. 1-132, Publisher: ARINC.

Avizienis, "A Fault Tolerance Infrastructure for Dependable Computing With High-Performance Cots Componenets", "Conference Proceedings on Dependable Systems and Networks", Jun. 2000, pp. 492-500, Publisher: IEEE, Published in: New York, NY.

Bauer et al., "Assumption Coverage Under Different Failure Modes in the Time-Triggered Architecture", "8th IEEE International Conference on Emerging Technologies and Factory Automation", Oct. 2001, pp. 333-341, Publisher: IEEE.

Bauer et al., "Transparent Redundancy in the Time-Triggered Architecture", "Proceedings of the Conference on Dependable Systems and Networks", 2000, pp. 5-13, Publisher: IEEE.

Bauer et al., "The Central Guardian Approach to Enforce Fault Isolation in a Time-Triggered System", "Proceedings of Symposium on Autonomous Decentralized Systems", Apr. 2003, pp. 37-44, Publisher: IEEE.

Bosch, "Can Specification Version 2.0", "SAE Handbook—Parts and Components", 1998, pp. 1-72, vol. 2, Publisher: Society of Automotive Engineers.

D'Luna, "A Single-Chip Universal Cable Set-Top Box/Modern Transceiver", "Journal of Sold-State Circuits", Nov. 1998, pp. 1647-1660, vol. 34, No. 11, Publisher. IEEE.

Driscoll et al., "The Real Byzantine Generals", "Proceedings of Digital Avionics System Conference", October 2004, p. 6.D.4-1-6.D.4-11, Publisher: IEEE.

Brinkmeyer, "Flexray International Workshop Slides", "www.flexray-group.com", Apr. 2002, pp. 1-356, Publisher: Flexray.

"Flexray Communication System: Protocol Specification Version 2.1 Revision A", "www.flexraygroup.com", Mar. 2006, pp. 1-8, Publisher: Flexray Consortium.

"Preliminary Node-Local Bus Guardian Specification Version 2.0.9", Dec.2005, pp. 1-75, Publisher: Flexray Consortium.

"Preliminary Central Bus Guardian Specification Version 2.0.9", Dec. 2005, pp. 1-38, Publisher: Flexray Consortium.

Grnarov et al., "A Highly Reliable Distributed Loop Network Architecture", "Proceedings of Fault-Tolerant Computing Symposium", Jun. 1980, pp. 319-324, Publisher: IEEE.

Gruenbacher, "Fault Injection for TTA", 1999, Publisher: Information Society Technologies.

Hall et al., "Ringing Out Fault Tolerance A New Ring Network for Superior Low-Dost Dependabilitiy", "International Conference on Dependable Systems and Networks (DSN'05)", 2005, pp. 298-307.

Hammett et al., "Achieving 10-9 Dependability With Drive-By-Wire Systems", "SAE World Congress", 2003, pp. 534-547, vol. 112, No. 7, Publisher: Society of Automotive Engineers.

Hopper et al., "Design and Use of an Integrated Cambridge Ring", "Journal on Selected Areas in Communications", Nov. 2003, pp. 775-784, vol. 1, No. 5, Publisher: IEEE.

Hoyme et al., "Safebus", "Proceedings of the Digital Avionics Systems Conference ", Oct. 1992, pp. 68-73, Publisher: IEEE.

Hoyme et al., "Safebus ", "IEEE Aerospce and Electronics Systems Magazine", Mar. 1993, pp. 34-39, vol. 8, No. 3, Publisher: IEEE.

Huber et al., "Silk: An Implementation of a Buffer Insertion Ring", "Journal on Selected Areas in Communications", Nov. 1983, pp. 766-774, vol. 1, No. 5, Publisher: IEEE.

Hwang et al., "Survival Reliability of Some Double-Loop Networks and Chordal Rings", "Transactions on Computers", 1995, pp. 1468-1471, vol. 44, No. 12, Publisher: IEEE.

"Internet Content Adaptation", "Network Appliance", Jul. 2001, pp. 1-13.

IEEE Computer Society, "1149.6 IEEE Standard for Boundary-Scan Testing of Advanced Digital Networks", Apr. 17, 2003, pp. 1-139, Publisher: IEEE, Published in: New York, NY.

Johansson et al., "On Communication Requirements for Control-By-Wire Applications", "Proceedings of System Safety Conference", Aug. 2003, pp. 1123-1132.

Kanoun et al., "Dependability Evaluation of Bus and Ring Communication Topologies for the Delta-4 Distr Fault-Tolerant Architecture", "Proceedings of the Symposium on Reliable Distributed Systems", 1991, pp. 130-141, Publisher: IEEE.

Kieckhafer et al., "The MAFT Architecture for Distributed Fault Tolerance", "Transactions on Computers", 1988, pp. 398-405, vol. 37, No. 4, Publisher: IEEE.

Kopetz et al., "TTP—A Protocol for Fault-Tolerant Real-Time Systems", "Computer", January 1194, pp. 14-23, vol. 27, No. 1, Publisher: IEEE Computer Society, Published in: Long Beach, CA.

Liu et al., "The Distributed Double-Loop Computer Network (DDLCN)", "ACM '80 Proceedings of the ACM 1980 Annual Conference", 1980, pp. 164-178, Publisher: ACM.

Lonn, "Initialsynchronization of TDMA Communication in Distributed Real-Time Systems", "Conference on Distributed Computing Systems", 1999, pp. 370-379, Publisher: IEEE.

Nayak et al., "Ring Reconfiguration in Presence of Close Fault Cuts", "Proceedings of Hawaii International Conference on System Science", 1996, pp. 422-428, Publisher: IEEE.

Paulitsch et al., "Cverage and the Use of Cyclic Redundancy Codes in Ultra-Dependable Systems", "2005 International Conference on Dependable Systems and Networks (DSN'05)", 2005, pp. 346-355.

Poledna et al., "Replica Determinism and Flexible Scheduling in Hard Real-Time Dependable Systms", "IEEE Transactions on Computers", Feb. 2000, pp. 100-111, vol. 49, No. 2, Publisher: IEEE.

Poledna, "Replica Determinism in Distributed Real-Time Systems: A Brief Survey", "Real-Time Systems", 1994, pp. 289-316, vol. 6.

"Software Considerations in Airborne Systems and Equipment Certification", "http://www.rtca.org", Dec. 1992, pp. 1-112, Publisher: RTCA.DO-178b.

Rushby, "Bus Architectures for Safety-Critical Embedded Systems, Embedded Software", "Proceedings of 1ST International Workshop on Embedded Software, Notes in Computer Science", Oct. 2001, pp. 306-323, vol. 2211, Publisher: Springer-Verlag, Published in: Germany.

Saltzer et al., "Why a Ring", "Proceedings of Symposium on Data Communications", 1981, pp. 211-217, Publisher: IEEE.

Sivencrona et al., "Protocol Membership Agreement in Distributed Communicaiton System—A Question of Brittleness", "SAE World Congress, Paper No. 2003-01-0108", 2003, pp. 1-6, Publisher: Society of Automotive Engineers Inc.

Steiner et al., "The Startup Problem in Fault-Tolerant Time-Triggered Communication", "International Conference on Dependable Systems and Networks (DSN'06)", 2006, pp. 35-44.

Steiner et al., "The Transition From Asynchronous to Synchronous System Operation: An Approach From Distributed Fault-Tolerant Systems", "Proceedings of Conference on Distributed Computing Systems", Jul. 2002, pp. 329-336, Publisher: IEEE.

Sundaram et al., "Controller Integrity in Automotive Failsafe System Architectures", "2006 SAE World Congress", 2006, pp. 1-10, Publisher: SAE International.

Tomlinson et al., "Extensible Proxy Services Framework", Jul. 2000, pp. 1-13, Publisher: Internet Society.

"Time-Triggered Protocol TTP/C", 2004, Publisher: TTTECH Computertechnik GmbH, Published in: Austria.

Wensley et al., "The Design, Analysis, and Verification of the Sift Fault Tolerant System", "Proceedings of Conference on Software Engineering", 1976, pp. 458-469, Publisher: IEEE Computer Society Press.

Yeh, "Design Condiserations in Boeing 777 Fly-by-Wire Computers", "High-Assurance Systems Engineering Symposium", Nov. 1998, pp. 64-72, Publisher: IEEE.

Yeh, "Triple-Triple Redundant 777 Primary Flight Computer", "Proceedings of the Aerospace Applications Conference", 1996, pp. 293-307, vol. 1, Publisher: IEEE, Published in: New York, NY.

* cited by examiner

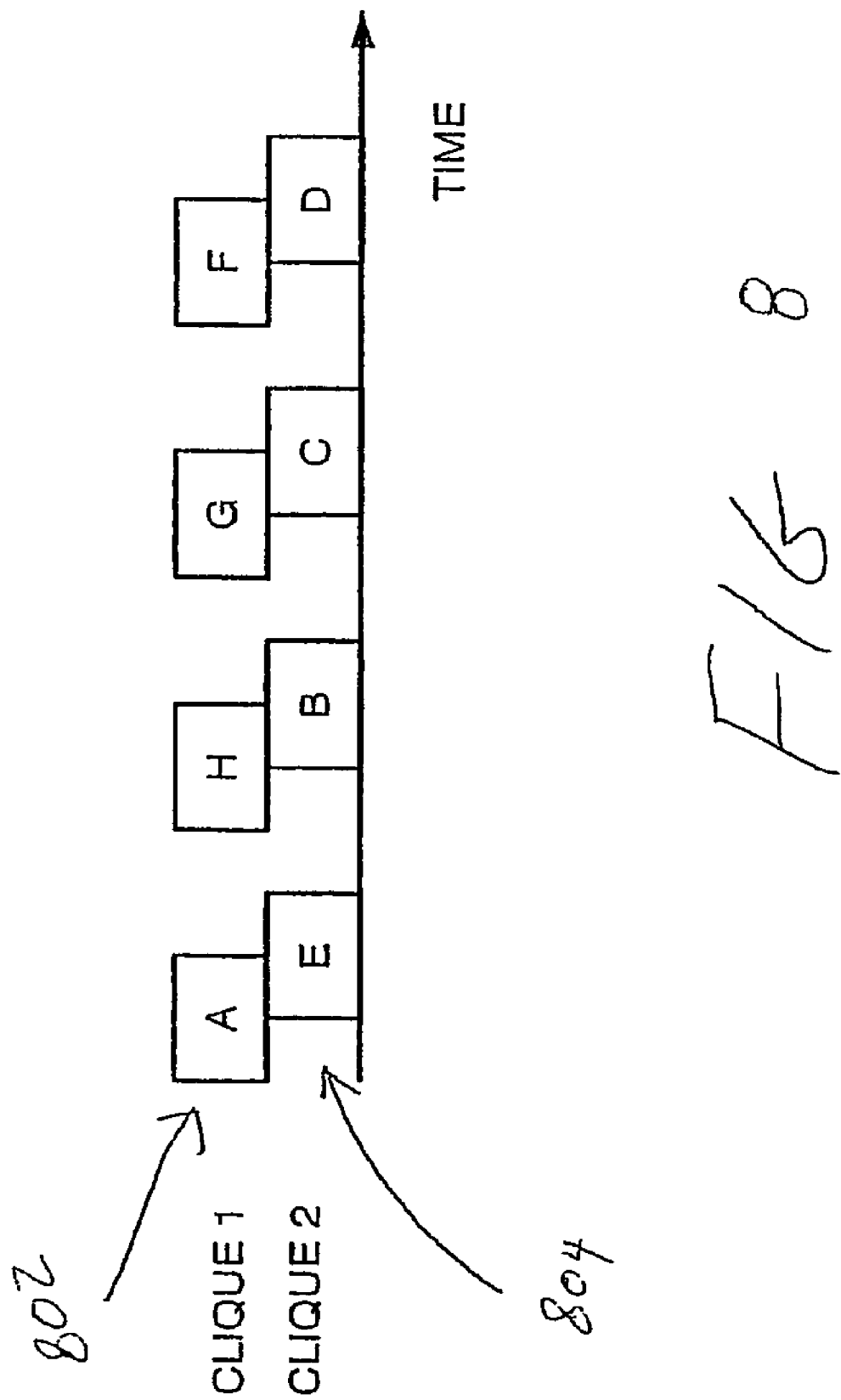

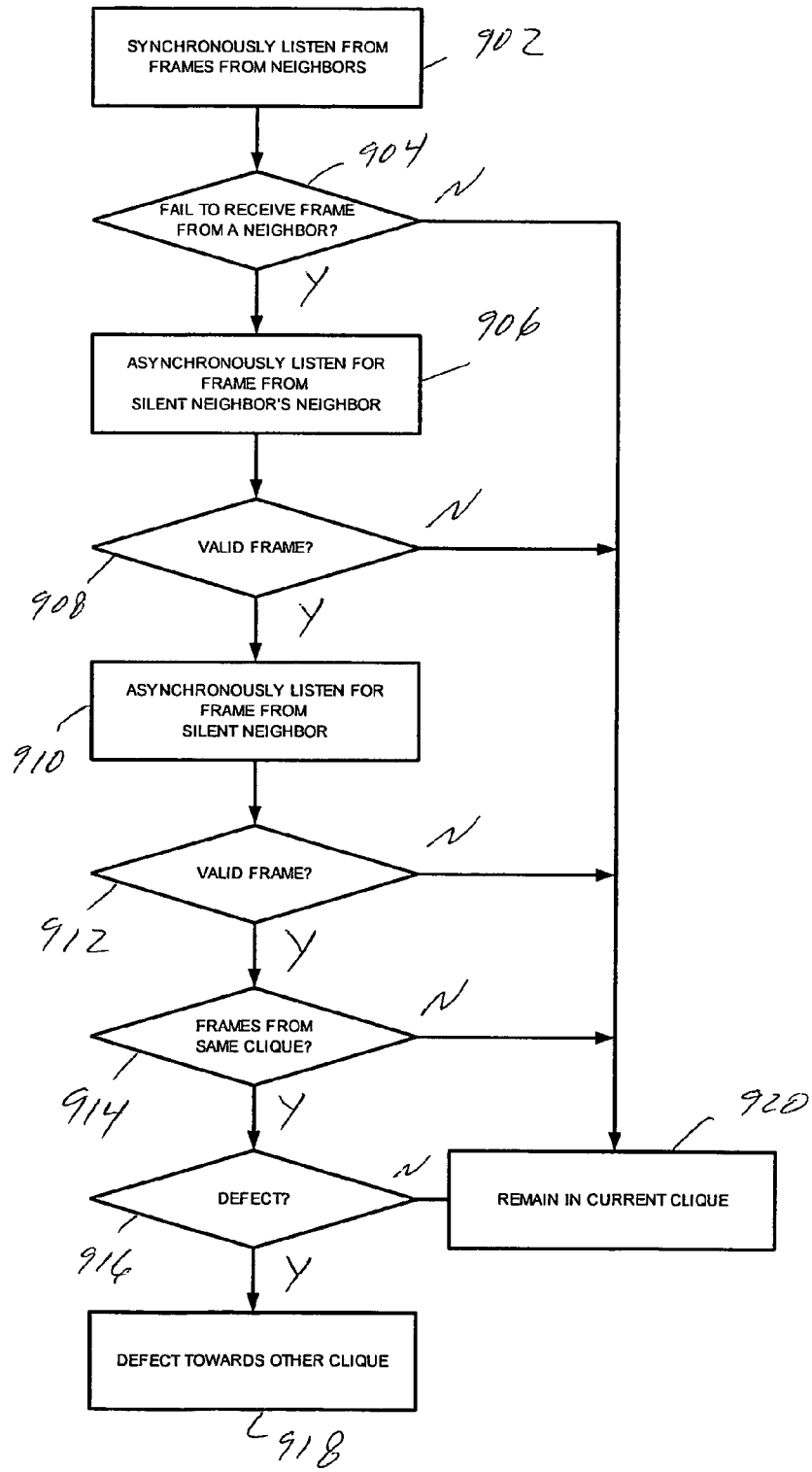

NEIGHBOR NODE BUS GUARDIAN SCHEME FOR A RING OR MESH NETWORK

CROSS REFERENCE TO RELATED APPLICATIONS

This application is related to and claims the benefit of the filing date of U.S. Provisional Application No. 60/523,892, filed on Nov. 19, 2003, and U.S. Provisional Application No. 60/523,865, filed on Nov. 19, 2003, both of which are incorporated herein by reference.

This application is related to the following applications filed on even date herewith, all of which are hereby incorporated herein by reference:

U.S. patent application Ser. No. 10/994,209, entitled "CLIQUE AGGREGATION IN TDMA NETWORKS."

U.S. patent application Ser. No. 10/993,931, entitled "UNSYNCHRONOUS MODE BROTHER'S KEEPER BUS GUARDIAN FOR A RING NETWORKS."

U.S. patent application Ser. No. 10/993,933, entitled "HIGH INTEGRITY DATA PROPAGATION IN A BRAIDED RING."

U.S. patent application Ser. No. 10/993,932, entitled "DIRECTIONAL INTEGRITY ENFORCEMENT IN A BI-DIRECTIONAL BRAIDED RING NETWORK."

U.S. patent application Ser. No. 10/993,162, entitled "MESSAGE ERROR VERIFICATION USING CHECKING WITH HIDDEN DATA" and which is also referred to here as the "H0005061 Application."

TECHNICAL FIELD

The following description relates to communication systems in general and to distributed, fault-tolerant communication systems in particular.

BACKGROUND

Distributed, fault-tolerant communication systems are used, for example, in applications where a failure could possibly result in injury or death to one or more persons. Such applications are referred to here as "safety-critical applications." One example of a safety-critical application is in a system that is used to monitor and manage sensors and actuators included in an airplane or other aerospace vehicle.

One architecture that is commonly considered for use in such safety-critical applications is the Time-Triggered Architecture (TTA). In a TTA system, multiple nodes communicate with one another over two replicated high-speed communication channels using, for example, the Time Triggered Protocol/C (TTP/C) or the FLEXRAY protocol. In some embodiments, at least one of the nodes in such a TTA system is coupled to one or more sensors and/or actuators over two replicated, low-speed serial communication channels using, for example, the Time Triggered Protocol/A (TTP/A).

In one configuration of such a TTA system, various nodes communicate with one another over two, replicated communication channels, each of which is implemented using a star topology. In such a configuration, each channel includes an independent, centralized bus guardian. Each such centralized bus guardian represents a single point of failure for the respective channel. In another configuration of a TTA system is implemented using a linear bus topology in which various nodes communicate with one another over two, replicated communication channels and where each node includes a separate, independent bus guardian for each communication channel to which that node is coupled. In other words, where two communication channels are used, each node includes two independent bus guardians. Providing multiple independent bus guardians within each node, however, may not be suitable for some applications (for example, due to the increased cost associated with providing multiple bus guardians within each node).

SUMMARY

In one embodiment, a node comprises an interface to communicatively couple the node to a channel. The channel communicatively couples the node to a first neighbor node in a first direction and to a second neighbor node in a second direction. When the first neighbor node is scheduled to transmit and the node receives data from the first neighbor node via the channel, the node determines if the transmission of the data complies with a policy. When the transmission of the data does not comply with the policy, the node does at least one of: blocks the data from being relayed along the channel and relays the data along the channel with information indicating that the transmission of the data does not comply with the policy.

The details of one or more embodiments of the claimed invention are set forth in the accompanying drawings and the description below. Other features and advantages will become apparent from the description, the drawings, and the claims.

DRAWINGS

FIG. 8 illustrates an exemplary scenario in which two cliques form in the network of FIG. 1.

FIG. 9 is flow diagram of one embodiment of a method of resolving cliques in a network of FIG. 1.

DETAILED DESCRIPTION

Figure 1:
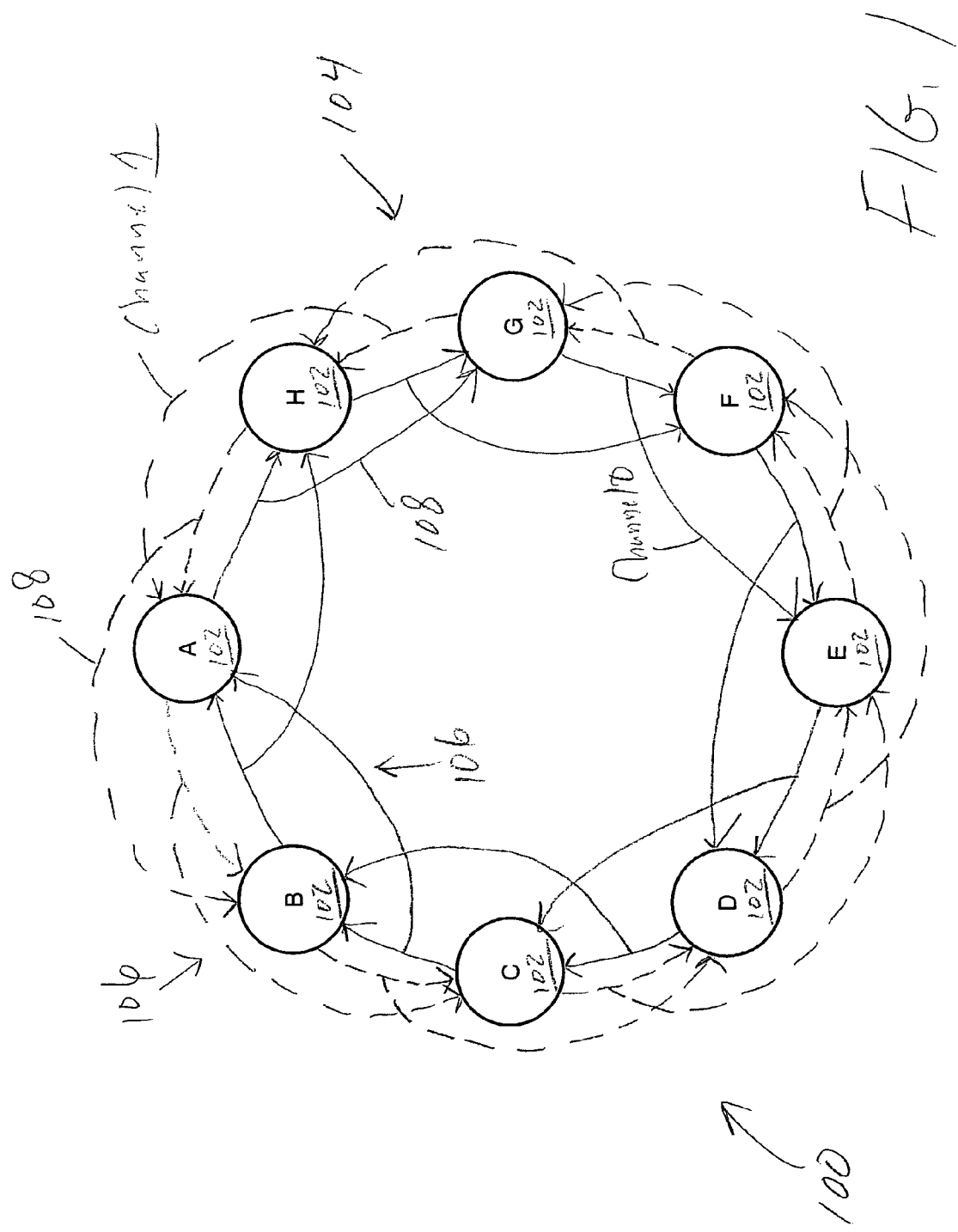
FIG. 1 is a block diagram of one embodiment of a communication network.

FIG. 1 is a block diagram of one embodiment of a communication network 100. Communication network 100 includes multiple nodes 102. Each node 102 of the network 100 is communicatively coupled to at least one channel 106. For a given direction in which data flows in the channel 106, the channel 106 communicatively directly couples (that is, with only one hop) each node 102 to at least two other nodes 102 from which that node 102 receives data (also referred to here as "receive-from nodes") and to at least two other nodes 102 to which that node 102 transmits data (also referred to here as the "transmit-to nodes"). In one embodiment, one of the received-from nodes 102 is designated as a "primary" receive-from node 102 and the other receive-from nodes 102 are designated as "secondary" receive-from nodes 102. When a node 102 "relays" data on a channel 106 in a given direction, that node 102 receives data from the primary receive-from node 102 for that channel 106 and direction and forwards the receive data onto each of the transmit-to nodes designated for that node 102 for that channel 106 and direction. Data received by a node from the secondary receive-from nodes 102 is used for the various comparison operations described below and/or is relayed in the event that suitable data is not received from the primary receive-from node. When a given node 102 "transmits" data (that is, when the given node 102 is the source of data communicated on the network 100) along a channel 106 in a given direction, that node 102 transmits the data to each of the transmit-to nodes 102 designated for that node 102 for that channel 102 and direction.

In the particular embodiment shown in FIG. 1, the nodes 102 are arranged in a ring 104 having a "braided ring" topology in which the nodes 102 communicate with one another over multiple communication channels 106. In the particular embodiment shown in FIG. 1, eight nodes 102 communicate with one another over two replicated communication channels 106. In other embodiments, a different number and/or type of nodes 102 and/or channels 106 and/or a different network topology are used.

Embodiments of network 100 are implemented using various media access schemes. For example, the embodiment shown in FIG. 1 is described here as being implemented using time division multiple access (TDMA) media access scheme (for example, the media access scheme implemented in the TTP/C or FLEXRAY protocols). In other embodiments, other media access schemes are used.

The eight nodes 102 shown in FIG. 1 are also individually labeled in FIG. 1 with the letters A through H and are referred to here individually as "node A," "node B," and so forth. As used herein, a "neighbor node" (or just "neighbor") is a node that is immediately next to a given node 102 in the ring 104. Each node 102 has two "neighbor nodes 102, one in the clockwise direction (also referred to here as the "clockwise neighbor node" or "clockwise neighbor") and one in the counter-clockwise direction (also referred to here as the "counter-clockwise neighbor node" or "counter-clockwise neighbor"). For example, the neighbor nodes 102 for node A are node H in the clockwise direction and node B in the counter-clockwise direction.

In addition, as used herein, a "neighbor's neighbor node" (or just "neighbor's neighbor") for a given node 102 is the neighbor node 102 of the neighbor node 102 of the given node 102. Each node 102 has two neighbor's neighbor nodes 102, one in the clockwise direction (also referred to here as the "clockwise neighbor's neighbor node" or "clockwise neighbor's neighbor") and one in the counter-clockwise direction (also referred to here as the "counter-clockwise neighbor's neighbor node" or "counter-clockwise neighbor's neighbor"). For example, the two neighbor's neighbor nodes for node A are node G in the clockwise direction and node C in the counter-clockwise direction.

The two communication channels 106 are individually labeled in FIG. 1 (and are also referred to here) as "channel 0" and "channel 1" respectively. In the embodiment shown in FIG. 1, each of the channels 106 is formed using multiple point-to-point, unidirectional serial links 108. Channel 0 interconnects the node 102 in the clockwise direction around the ring 104 and channel 1 interconnects the nodes 102 in the counter-clockwise direction around the ring 104. In other embodiments, other types of links are used. For example, in one such other embodiment, bidirectional links are used and the devices, systems, and techniques described here are performed for each direction in which communications occur.

As used here, when a link 108 is described as being connected "from" a first node 102 "to" a second node 102, the link 108 provides a communication path for the first node 102 to send data to the second node 102 over the link 108. That is, the direction of that unidirectional link 108 is from the first node 102 to the second node 102.

A link 108 is connected from each node 102 to that node's clockwise neighbor node 102. A link 108 is also connected from each node 102 to that node's clockwise neighbor's neighbor node 102. For example, a link 108 is connected from node A to node H and a link 108 is connected from node A to node G. These clockwise links 108 make up channel 0 and are shown in FIG. 1 using solid lines.

A link 108 is connected from each node 102 to that node's counter-clockwise neighbor node 102. A link 108 is also connected from each node 102 to that node's counter-clockwise neighbor's neighbor node 102. For example, a link 108 is connected from node A to node B and a link 108 is connected from node A to node C. These counter-clockwise links 108 make up channel 1 and are shown in FIG. 1 using dashed lines.

The links 108 that connect a given node 102 to that node's respective clockwise and counter-clockwise neighbor nodes are also referred to here as "direct" links 108. The links 108 that connect a given node 102 to that node's respective clockwise and counter-clockwise neighbor's neighbors are referred to here as "skip" links 108.

In the particular embodiment shown in FIG. 1, for channel 0, the receive-from nodes for each node 102 are that node's counter-clockwise neighbor and counter-clockwise neighbor's neighbor and the transmit-to nodes for each node 102 are that node's clockwise neighbor and clockwise neighbor's neighbor. In the embodiments described herein, the primary receive-from node is node's counter-clockwise neighbor (though in other embodiments, the primary receive-from node is the node's counter-clockwise neighbor's neighbor). In the particular embodiment shown in FIG. 1, for channel 1, the receive-from nodes for each node 102 are that node's clockwise neighbor and clockwise neighbor's neighbor and the transmit-to nodes for each node 102 are that node's counter-clockwise neighbor and counter-clockwise neighbor's neighbor. In the embodiments described herein, the primary receive-from node is node's clockwise neighbor.

In the particular embodiment shown in FIG. 1, the network 100 is implemented as a peer-to-peer network in which each transmission is intended to be received by each node 102 of the network 100. In other embodiments, each transmission is intended for a particular destination node. Moreover, in the embodiments described here, data are communicated in the network 100 in the form of frames of data though it is to be understood that, in other embodiments, other units of data are communicated over the network 100.

In the embodiment described here in connection with FIGS. 1-5, the nodes 102 in the network 100 operate in at least two modes—an unsynchronized mode and a synchronized mode. When operating in a synchronized mode, the nodes 102 are synchronized to a global time base and transmit in accordance with a TDMA media access scheme. With such a TDMA media access scheme, a schedule is used to determine when the nodes 102 in the network 100 transmit during a given schedule period or round. During a given schedule period, various nodes 102 in the network 100 are assigned a respective time slot in which to transmit. In other words, for any given time slot, the node 102 assigned to that time slot is allowed to transmit during that time slot (also referred to here as the "scheduled node" 102). In this embodiment, the scheduled node performs the processing described below in connection with FIG. 2. The other nodes 102 in the network 100 perform the relay processing described below in connection with FIGS. 3A-3B and 4A-4B.

Figure 7A:
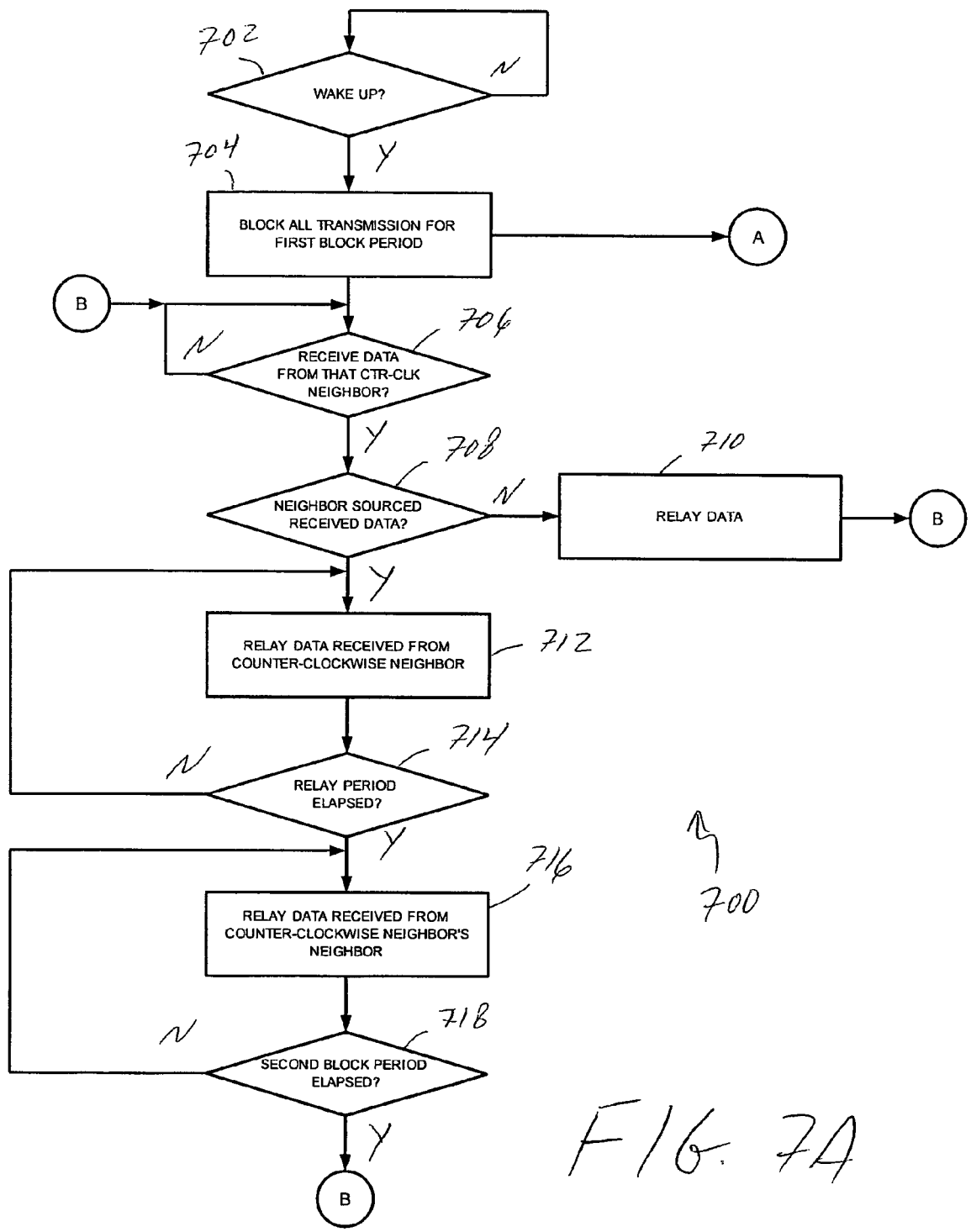
FIGS. 7A-7B are flow diagrams of one embodiment of a method of communicating in the network of FIG. 1 while operating in an unsynchronized mode.
Figure 7B:
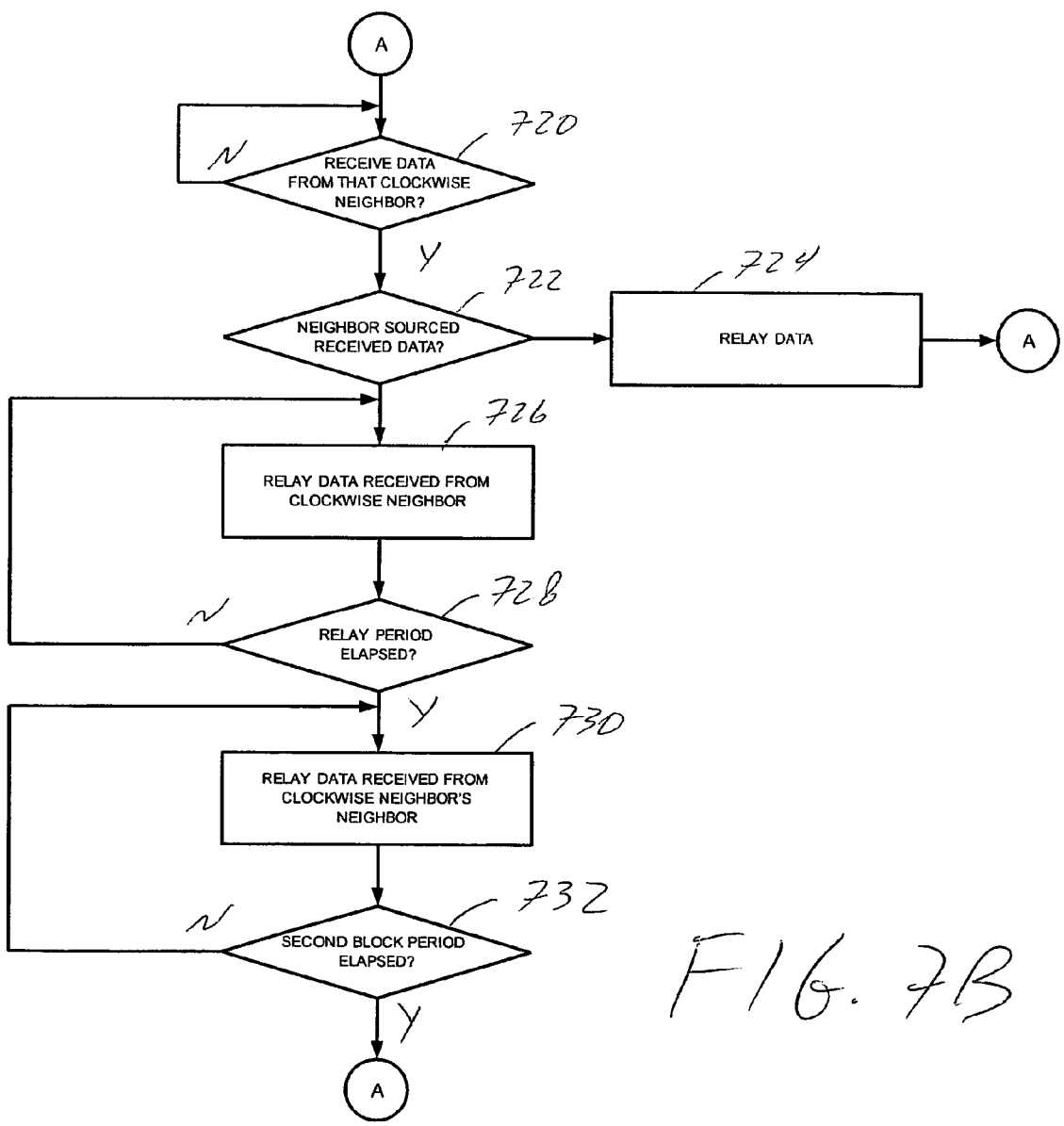

When the nodes 102 are operating in an unsynchronized mode, the nodes 102 have not yet synchronized to a global time base and are not yet transmitting in accordance with a TDMA schedule. FIGS. 7A-7B illustrate at least a portion of the processing performed, in one embodiment, by the nodes 102 of the network 100 while operating in an unsynchronized mode.

Figure 2:
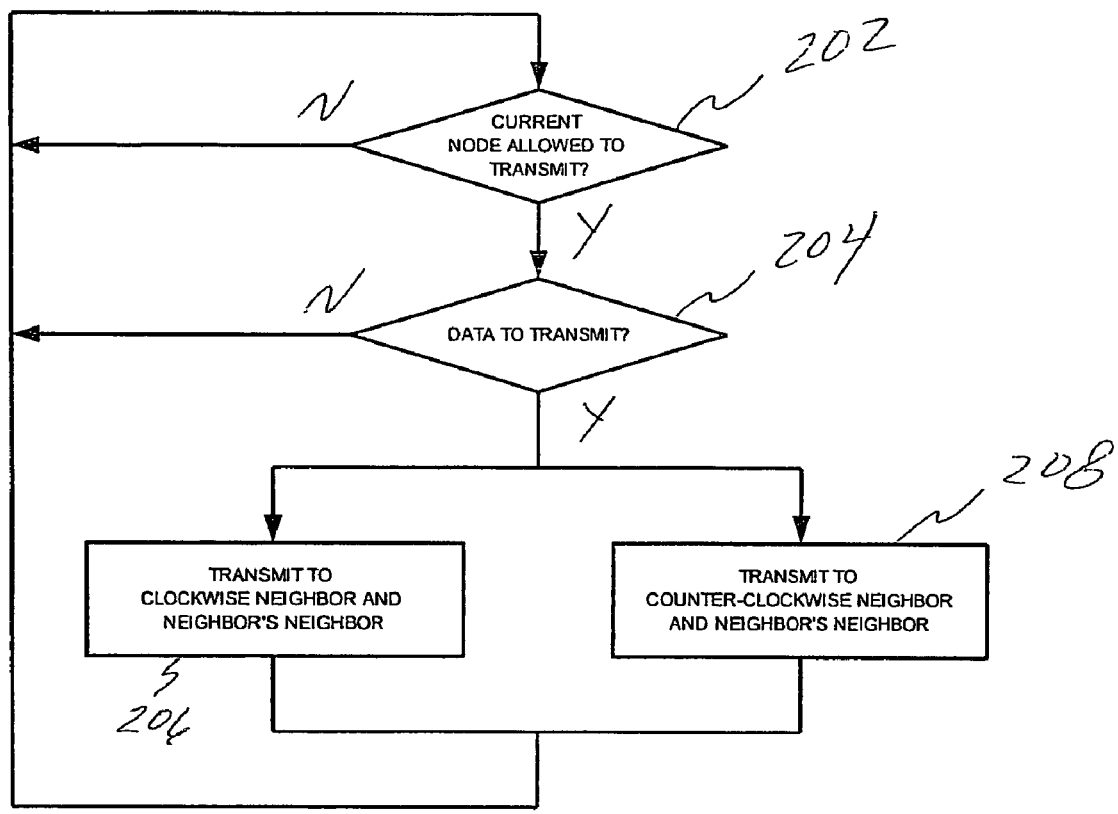
FIG. 2 is flow diagram of one embodiment of a method of transmitting data in the network of FIG. 1.

FIG. 2 is flow diagram of one embodiment of a method 200 of transmitting data in the network 100 of FIG. 1. The embodiment of method 200 shown in FIG. 2 is described here as being implemented in the embodiment described here in connection with FIGS. 1-5. Method 200 is performed by a node 102 that is operating in a synchronized mode in accordance with a TDMA schedule. Each node 102, in such an embodiment, performs the processing of method 200 when that node 102 is the scheduled node 102 (that is, when the current time slot is assigned to that node 102 by the TDMA schedule). In the context of FIG. 2, the node 102 that is performing the processing of method 200 is referred to here as the "current" node 102. In one embodiment, at least a portion of the functionality described here as being performed by the current node 102 is implemented in a controller included in the node 102. Other embodiments of method 200 are implemented in other ways.

The current node 102 performs the processing of method 200 when the current node 102 determines that that node 102, in accordance with the TDMA schedule, is allowed to transmit on the network 100 (block 202). Each node 102 in the network 100 maintains information necessary to make such a determination. In the embodiment of FIGS. 1-5, such information includes information related to the TDMA schedule and the global time base to which the nodes 102 are synchronized.

When the current node 102 is allowed to transmit and the node 102 has data to transmit (checked in block 204), the current node 102 transmits a frame of data, along channel 0, to the current node's clockwise neighbor and clockwise neighbor's neighbor (block 206) and, along channel 1, to the current node's counter-clockwise neighbor and counter-clockwise neighbor's neighbor (block 208). The current node 102 transmits the frame to the current node's clockwise and counter-clockwise neighbors using the respective direct links 108. The current node 102 transmits the frame to the current node's clockwise and counter-clockwise neighbor's neighbors using the respective skip links 108. In one implementation of such an embodiment, the current node 102 includes a first transceiver that transmits the frame on channel 0 to the current node's clockwise neighbor and clockwise neighbor's neighbor and a second transceiver that transmits the frame on channel 1 to the current node's counter-clockwise neighbor and counter-clockwise neighbor's neighbor.

Figure 3A:
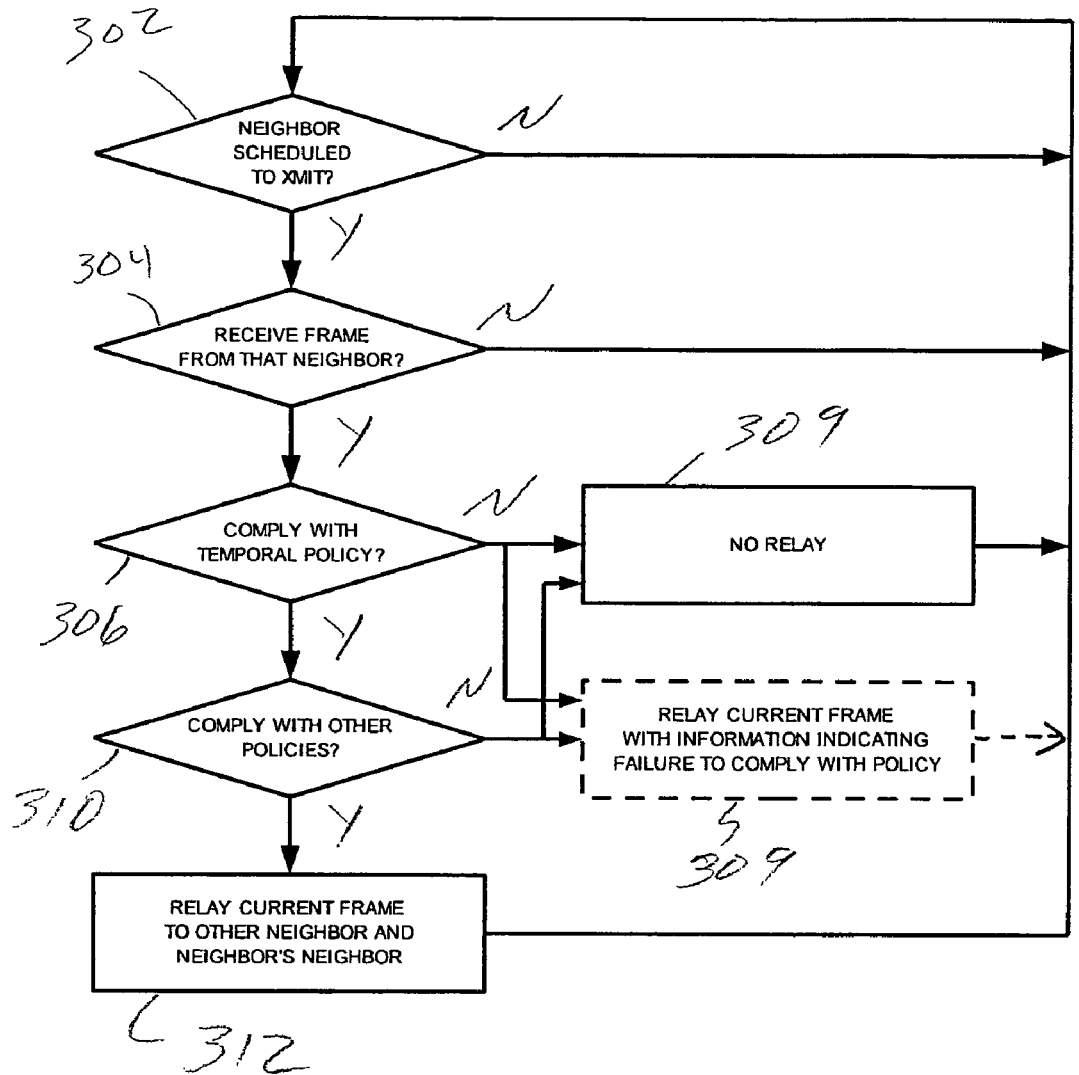
FIG. 3A is flow diagram of an embodiment of a method of relaying data in the network of FIG. 1.

FIG. 3A is flow diagram of one embodiment of a method 300 of relaying data in the network 100 of FIG. 1. When a node "relays" data, the node 102 receives data from one or more receive-from nodes and forwards the received data onto the one or more transmit-to nodes. That is, when a node 102 is relaying data, the node 102 is not the source of the data that the node 102 is forwarding onto other nodes. The embodiment of method 300 shown in FIG. 3A is described here as being implemented in the braided-ring embodiment described here in connection with FIGS. 1-5. In other embodiments, method 300 is implemented using other network topologies. One example of an alternative network topology in which method 300 can be implemented is a network topology that comprises two "simplex" ring channels. In one implementation of such a simplex ring network, the network uses a topology similar to the one shown in FIG. 1 except that there are no skip links that communicatively couple each node to its clockwise and counter-clockwise neighbor's neighbors.

Method 300 is performed by a node 102 that is operating in a synchronized mode in accordance with a TDMA schedule. Each node 102, in such an embodiment, performs the processing of method 300 when one of that node's neighbors is the scheduled node 102 for the current time slot. In the context of FIG. 3A, the node 102 performing the processing of method 300 is referred to here as the "current" node 102. In one embodiment, at least a portion of the functionality described here as being performed by the current node 102 is implemented in a controller included in the node 102. Other embodiments of method 300 are implemented in other ways.

The current node 102 performs the processing of method 300 when the current node 102 determines that one of the neighbors of the current node 102 is scheduled to transmit during the current time slot (checked in block 302). Such a neighbor is also referred to here in the context of FIG. 3A as the "scheduled neighbor." In the embodiment of FIGS. 1-5, the current node 102 makes this determination based on information including the TDMA schedule and the global time base to which the nodes 102 are synchronized.

When the current node 102 determines that one of its neighbors is the scheduled node for the current time slot, the current node 102 only relays frames sourced from the scheduled neighbor that are received by the current node 102 from the scheduled neighbor via the direct link 108 that couples the scheduled neighbor to the current node 102. That is, if the current node 102 receives a frame that is sourced from a node 102 other than the scheduled neighbor, the current node 102 does not relay that frame.

When the current node 102 start receiving a frame from the scheduled neighbor (checked in block 304), the current node 102 checks if the transmission complies with one or more policies that are implemented in the network 100. In the particular embodiment shown in FIG. 3A, the current node 102 checks if the transmission complies with a temporal policy that specifies, for example, a particular window in which a transmission must start (checked in block 306). In one implementation of such an embodiment where the TTP/C or FLEXRAY protocol is supported, the current node 102 checks if the transmission complies with the temporal transmission requirements of the supported protocol. In the embodiment shown in FIG. 3A, if the transmission fails to comply with the temporal policy (for example, where a slightly-off-specification (SOS) fault occurs), the current node 102 does not relay the current frame (block 308). In an alternative embodiment (illustrated using dotted lines in FIG. 3A), if the transmission fails to comply with the temporal policy, the current node 102 relays the current frame along with the information (for example, an appended or shared integrity field) indicating that the transmission has failed to comply with the temporal policy (block 309). In another embodiment (not shown), if the transmission fails to comply with a first aspect of the temporal policy, the current node 102 does not relay the transmission and if the transmission fails to comply with a different aspect of the temporal policy (while complying with the first aspect), the current node 102 relays the current frame along with information indicating that the transmission has failed to comply with that aspect of the policy.

If the transmission complies with the temporal policy, the current node 102 checks if the transmission complies with one or more other policies (block 310). For example, in one embodiment, the current node 102 checks if the transmission complies with one or more semantic policies (for example, policies implementing semantic protocol state filtering). In another embodiment, where each frame includes a cyclic redundancy check (CRC) field that is calculated based on the contents of the frame, the current node 102 checks the CRC field to determine if any errors have been introduced into the frame in the course of transmitting the frame from the scheduled node to the current node 102. Another example of such a policy is an encoding layer enforcement policy. In another example, a frame-length policy is used and the current node 102 checks the length of the current frame (in such an example, failures to comply with the frame-length policy would, for example, be processed as described in connection with block 309 of FIG. 3A).

If the transmission fails to comply with one or more of the other policies, the current node 102 does not relay the transmission (block 308). In an alternative embodiment (shown in FIG. 3A using dashed lines), the current node 102 relays the current frame along with the information (for example, an appended or shared integrity field) indicating that the transmission has failed to comply with one or more policies (block 309). In another embodiment (not shown), if the transmission fails to comply with a first policy, the current node 102 does not relay the transmission and if the transmission fails to comply with a different policy (while complying with the first policy), the current node 102 relays the current frame along with information indicating that the transmission has failed to comply with the latter policy.

Otherwise, if the transmission complies with all the policies, the current node 102 relays the current frame to the current node's next neighbor and next neighbor's neighbor along the channel from which the current frame is being received (block 312). For example, where the scheduled node is node A and the current node is node B, the current node relays the current frame to node C (node B's next neighbor along channel 1) and to node D (node B's next neighbor's neighbor along channel 1).

In other embodiments, the current node 102 checks if the transmission complies with other policies instead of or in addition to the ones described above. For example, in one such other embodiment, the current node 102 checks the directional integrity of the transmission by the scheduled node (for example, in the manner described below in connection with FIG. 12) and appends to the frame a field indicating whether the frame was transmitted with directional integrity.

Figure 3B:
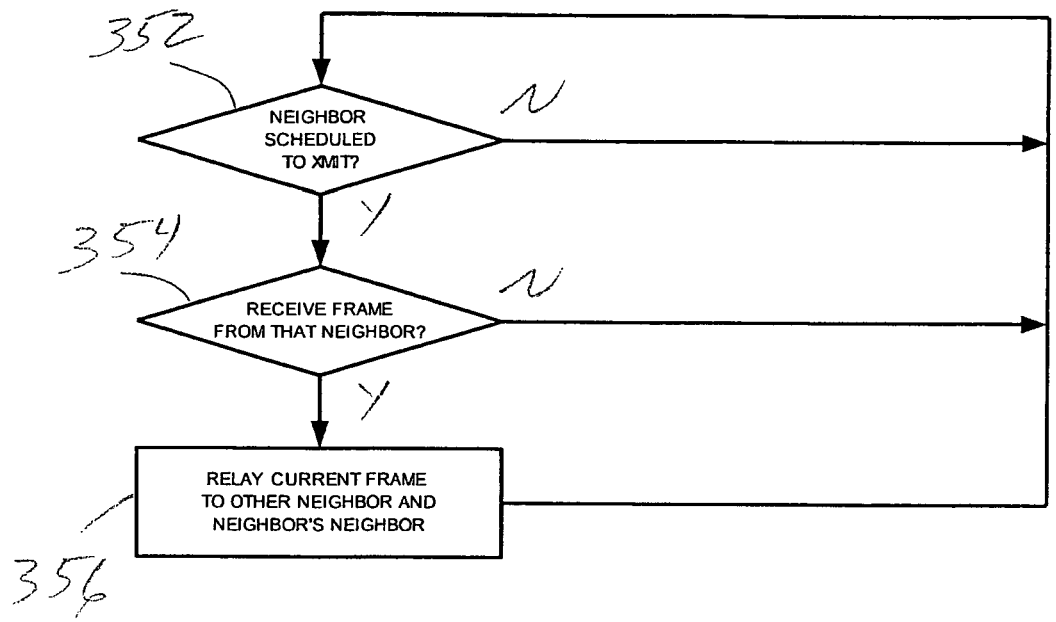
FIG. 3B is flow diagram of an embodiment of a method of relaying data in the network of FIG. 1.

FIG. 3B is flow diagram of another embodiment of a method 350 of relaying data in the network 100 of FIG. 1. The embodiment of method 350 shown in FIG. 3B is described here as being implemented in the braided-ring embodiment described here in connection with FIGS. 1-5. In other embodiments, method 350 is implemented using other network topologies. One example of an alternative network topology in which method 350 can be implemented is a network topology that comprises two "simplex" ring channels. In one implementation of such a simplex ring network, the network uses a topology similar to the one shown in FIG. 1 except that there are no skip links that communicatively couple each node to its clockwise and counter-clockwise neighbor's neighbors.

Method 350 is performed by a node 102 that is operating in a synchronized mode in accordance with a TDMA schedule. Each node 102, in such an embodiment, performs the processing of method 350 when one of that node's neighbors is the scheduled node 102 for the current time slot. In the context of FIG. 3B, the node 102 performing the processing of method 350 is referred to here as the "current" node 102. In one embodiment, at least a portion of the functionality described here as being performed by the current node 102 is implemented in a controller included in the node 102. Other embodiments of method 350 are implemented in other ways.

The current node 102 performs the processing of method 350 when the current node 102 determines that one of the neighbors of the current node 102 is scheduled to transmit during the current time slot (checked in block 352). Such a neighbor is also referred to here in the context of FIG. 3B as the "scheduled neighbor." In the embodiment of FIGS. 1-5, the current node 102 makes this determination based on information including the TDMA schedule and the global time base to which the nodes 102 are synchronized.

In method 350 (as in method 300 of FIG. 3A), when the current node 102 determines that one of its neighbors is the scheduled node for the current time slot, the current node 102 only relays frames sourced from the scheduled neighbor that are received by the current node 102 from the scheduled neighbor via the direct link 108 that couples the scheduled neighbor to the current node 102. That is, if the current node 102 receives a frame that is sourced from a node 102 other than the scheduled neighbor, the current node 102 does not relay that frame. However, unlink in method 300 of FIG. 3A, in method 350 of FIG. 3B, the current node 102 does not perform the "bus guardian" processing associated with blocks 308-310.

When the current node 102 start receiving a frame from the scheduled neighbor (checked in block 354), the current node 102 relays the received frame to the current node's next neighbor and next neighbor's neighbor along the channel from which that frame is being received (block 356). For example, where the scheduled node is node A and the current node is node B, the current node relays the frame received from node A to node C (node B's next neighbor along channel 1) and to node D (node B's next neighbor's neighbor along channel 1).

Figure 4A:
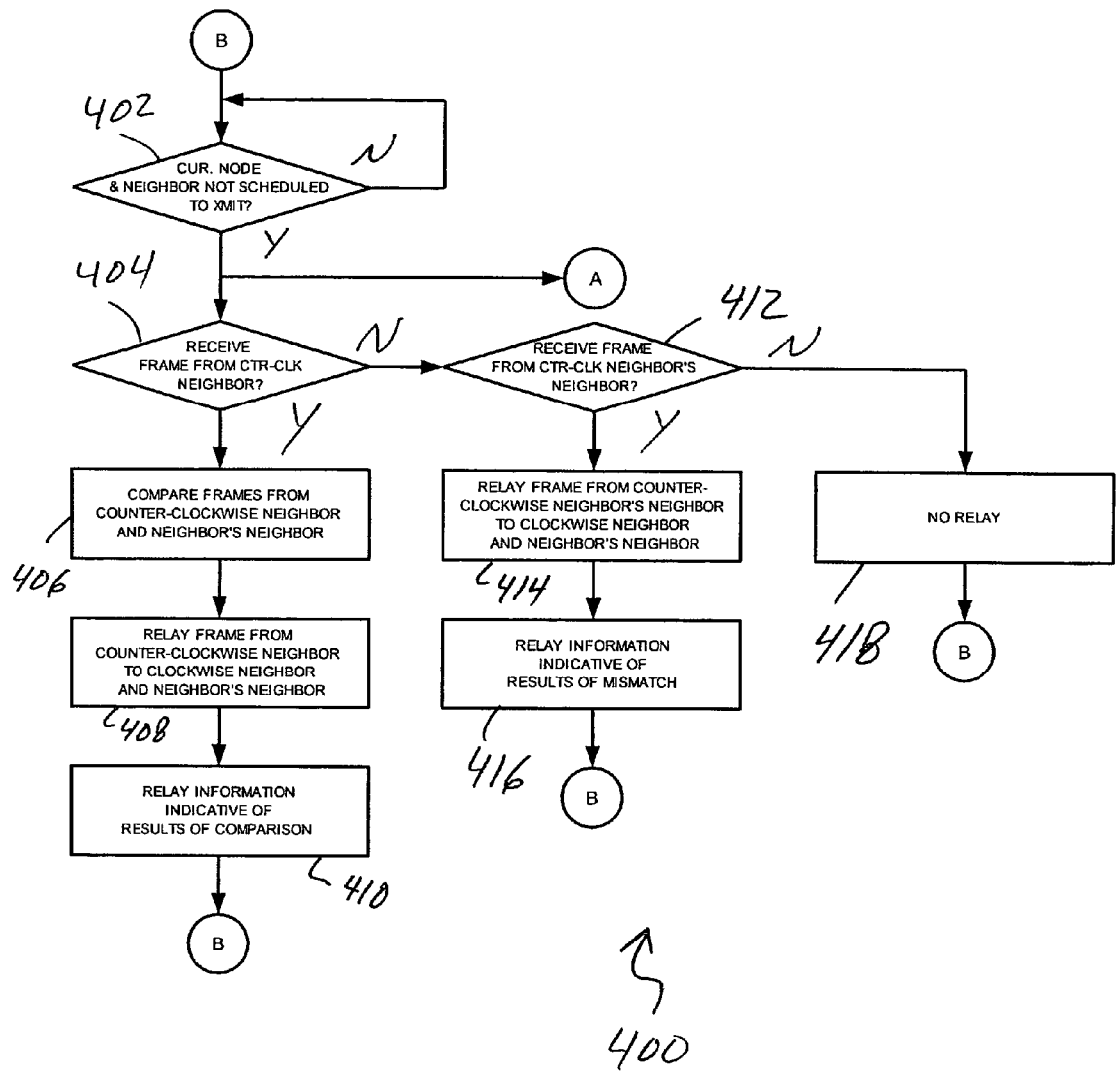
FIGS. 4A-4B are flow diagrams of an embodiment of a method of relaying data in the network of FIG. 1.
Figure 4B:
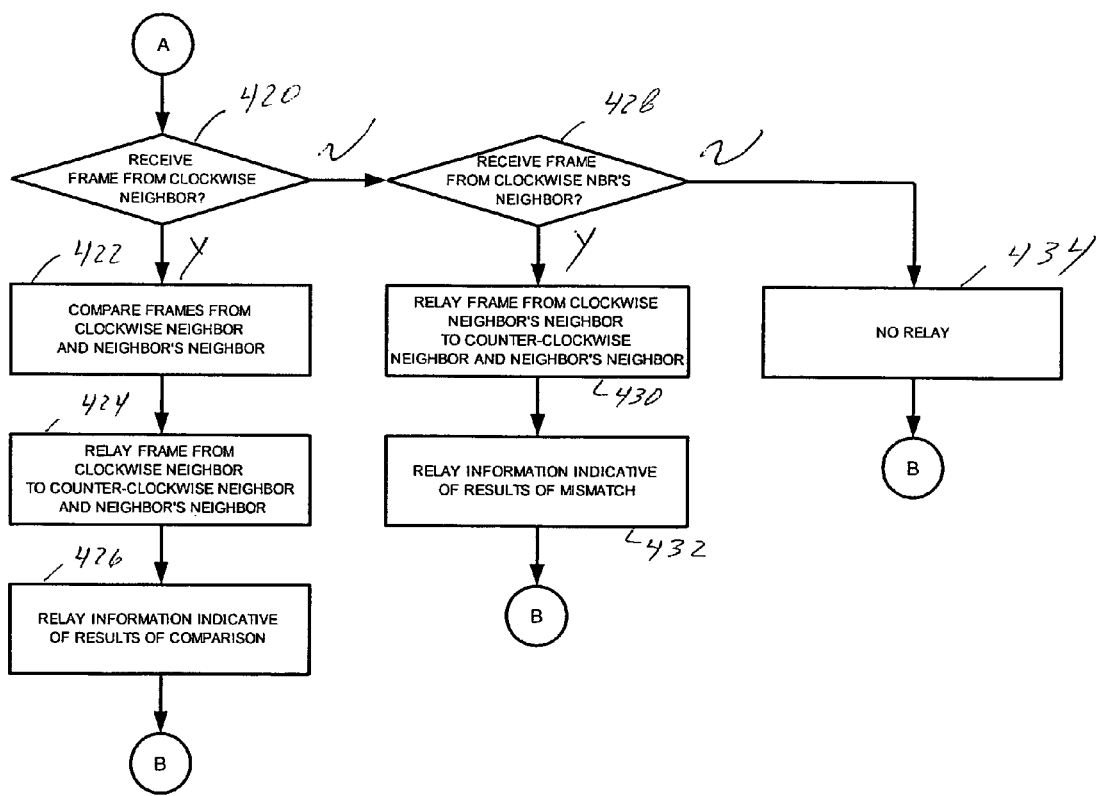

FIGS. 4A-4B are flow diagrams of one embodiment of a method 400 of relaying data in the network 100 of FIG. 1. The embodiment of method 400 shown in FIGS. 4A-4B is described here as being implemented in the embodiment described here in connection with FIGS. 1-5. Method 400 is performed by a node 102 that is operating in a synchronized mode in accordance with a TDMA schedule. Each node 102, in such an embodiment, performs the processing of method 400 when that node 102 is not scheduled to transmit during the current time slot and neither of that node's neighbors are scheduled to transmit during the current time slot. In the context of FIGS. 4A-4B, the node 102 performing the processing of method 400 is referred to here as the "current" node 102. In one embodiment, at least a portion of the functionality described here as being performed by the current node 102 is implemented in a controller included in the node 102. Other embodiments of method 400 are implemented in other ways.

The current node 102 performs the processing of method 400 when the current node 102 is not scheduled to transmit during the current time slot and neither of the current node's neighbors are scheduled to transmit during the current time slot (checked in block 402 of FIG. 4A). In the embodiment of FIGS. 1-5, the current node 102 makes this determination based on information including the TDMA schedule and the global time base to which the nodes 102 are synchronized.

When the current node 102 determines that the current node 102 is not scheduled to transmit during the current time slot and neither of the current node's neighbors are scheduled to transmit during the current time slot and the current node 102 starts to receive a frame from the current node's counter-clockwise neighbor on channel 0 (checked in block 404), the current node 102 compares the frame being received from the current node's counter-clockwise neighbor on channel 0 to any frame that is being received from the current node's counter-clockwise neighbor's neighbor on channel 0 (block 406). In the embodiment shown in FIG. 4, a bit-by-bit comparison is performed. Moreover, as described below in connection FIG. 5, because the frames will likely be received at the current node 102 at slightly different times, de-skew functionality is used to de-skew the received frames. The current node 102 relays the frame that is being received from the current node's counter-clockwise neighbor on channel 0 to the current node's clockwise neighbor and clockwise neighbor's neighbor along the channel 0 (block 408). After the current frame has been relayed and the comparison is complete, the current node 102 relays information indicative of the results of the comparison in or after the frame received from the current node's counter-clockwise neighbor (block 410). The current node 102 relays the information indicative of the results of the comparison to the current node's clockwise neighbor and clockwise neighbor's neighbor along the channel 0. In one embodiment, the information indicative of the results of the comparison comprises a one-bit, appended integrity field that the current node 102 appends to the frame received from the current node's counter-clockwise neighbor. In another embodiment, a shared integrity field is included at the end of each frame. In such an embodiment, the current node 102 sets the shared integrity field to a "negative" value (for example, a value of "0") if the comparison indicates that the two frames are not identical and, otherwise, does not alter the shared integrity field if the comparison indicates that the two frames are identical.

If the current node 102 does not receive a frame from the current node's counter-clockwise neighbor on channel 0 (for example, after a predetermined time-out period has elapsed) but starts to receive a frame from the current node's counter-clockwise neighbor's neighbor on channel 0 (checked in block 412), the current node 102 relays the frame that is being received from the current node's counter-clockwise neighbor's neighbor on to the current node's clockwise neighbor and clockwise neighbor's neighbor along the channel 0 (block 414). After that frame has been relayed, the current node 102 relays in or after that frame information indicating that there was a "mismatch" at the current node 102 for channel 0 (block 416). The current node 102 relays this information to the current node's clockwise neighbor and clockwise neighbor's neighbor along the channel 0. Because no frame was received from the counter-clockwise neighbor of the current node 102, it is not the case that a frame received from the counter-clockwise neighbor is identical to the frame received from the counter-clockwise neighbor's neighbor of the current node 102.

If the current node 102 does not receive a frame from the current node's counter-clockwise neighbor on channel 0 or from the current node's counter-clockwise neighbor's neighbor on channel 0, the current node 102 does not relay any data along channel 0 for the current time slot (block 418).

The current node 102 performs the same processing for frames received from channel 1. When the current node 102 determines that the current node 102 is not scheduled to transmit during the current time slot and neither of the current node's neighbors are scheduled to transmit during the current time slot and the current node 102 starts to receive a frame from the current node's clockwise neighbor on channel 1 (checked in block 420 of FIG. 4B), the current node 102 compares the frame being received from the current node's clockwise neighbor on channel 1 to any frame that is being received from the current node's clockwise neighbor's neighbor on channel 1 (block 422). In the embodiment shown in FIG. 4, a bit-by-bit comparison is performed. Moreover, because the frames will likely be received at the current node 102 at slightly different times, de-skew functionality is used to de-skew the received frames. The current node 102 relays the frame that is being received from the current node's clockwise neighbor on channel 1 to the current node's counter-clockwise neighbor and counter-clockwise neighbor's neighbor along the channel 1 (block 424). After the current frame has been relayed and the comparison is complete, the current node 102 relays information indicative of the results of the comparison in or after the frame received from the current node's clockwise neighbor (block 426). The current node 102 relays the information indicative of the results of the comparison to the current node's counter-clockwise neighbor and counter-clockwise neighbor's neighbor along the channel 1. In one embodiment, an appended integrity field is used. In another embodiment, a shared integrity field is used.

If the current node 102 does not receive a frame from the current node's clockwise neighbor on channel 1 (for example, after a predetermined time-out period has elapsed) but starts to receive a frame from the current node's clockwise neighbor's neighbor on channel 1 (checked in block 428), the current node 102 relays the frame that is being received from the current node's clockwise neighbor's neighbor on to the current node's counter-clockwise neighbor and counter-clockwise neighbor's neighbor along the channel 1 (block 430). After that frame has been relayed, the current node 102 relays in or after that frame information indicating that there was a "mismatch" at the current node 102 for channel 1 (block 432). The current node 102 relays this information to the current node's counter-clockwise neighbor and counter-clockwise neighbor's neighbor along the channel 1. Because no frame was received from the clockwise neighbor of the current node 102, it is not the case that a frame received from the clockwise neighbor is identical to the frame received from the clockwise neighbor's neighbor of the current node 102.

If the current node 102 does not receive a frame from the current node's clockwise neighbor on channel 1 or from the current node's clockwise neighbor's neighbor on channel 1, the current node 102 does not relay any data along channel 1 for the current time slot (block 434).

In one example, the current node 102 is node A and node E is the node that is scheduled to transmit during the current time slot. In such an example, node A receives a frame from node B (node A's counter-clockwise neighbor) via the respective direct link 108 of channel 0 and compares this frame to any frame node A receives from node C (node A's counter-clockwise neighbor's neighbor) via the respective skip link 108 of channel 0. Node A relays the frame that is being received from node B and the information indicative of the results of the comparison to node H (node A's next neighbor along channel 0) and to node G (node A's next neighbor's neighbor along channel 0). In such an example, node A also receives a frame from node H (node A's clockwise neighbor) via the respective direct link 108 of channel 1 and compares this frame to any frame node A receives from node G (node A's clockwise neighbor's neighbor) via the respective skip link 108 of channel 1. Node A relays the frame received from node H and the information indicative of the results of the comparison to node B (node A's next neighbor along channel 1) and to node C (node A's next neighbor's neighbor along channel 1).

In the embodiments illustrated in FIG. 4, if frames are received by the current node 102 on both the direct link 108 and the skip link 108, the current node 102 relays the frame received on the direct link 108. In other embodiments, if frames are received by the current node 102 on both the direct link 108 and the skip link 108, the current node 102 relays the frame received on the skip link 108.

Figure 5:
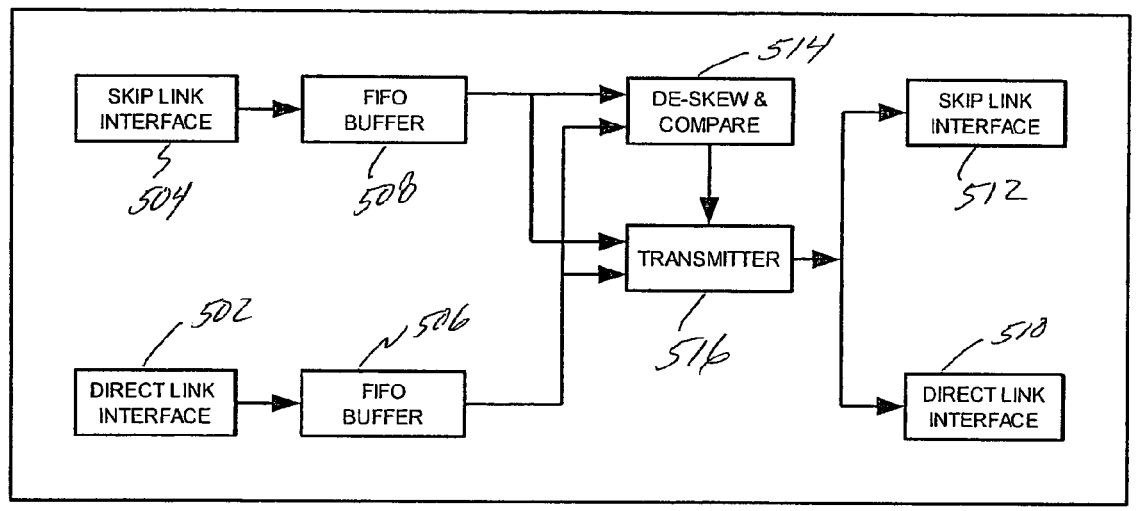
FIG. 5 is a block diagram illustrating logical components of a node that are used to implement, in one example, the comparison and relaying processing of the methods and shown in FIGS. 3 and 4A-4B.

FIG. 5 is a block diagram illustrating logical components of a node 102 that are used to implement, in one example, the comparison and relaying processing of methods 300 and 400 of FIGS. 3 and 4A-4B, respectively. The node 102 that is performing the particular comparison and relaying processing is referred to, in the context of FIG. 5, as the current node 102. The logical components of the current node 102 used to the perform comparison and relaying processing for frames received on channel 0 are shown in FIG. 5. It is to be understood the comparison and relaying processing for frames received on channel 1 are performed using logical components similar to those shown in FIG. 5.

In the example shown in FIG. 5, the current node 102 includes a first direct link interface 502 that communicatively couples the current node 102 to the counter-clockwise direct link 108 of channel 0, which is connected to the current node's counter-clockwise neighbor. The current node 102 also includes a first skip link interface 504 that communicatively couples the current node 102 to the counter-clockwise skip link 108 of channel 0, which is connected to the current node's counter-clockwise neighbor's neighbor. A direct link first-in-first-out (FIFO) buffer 506 is coupled to the first direct link interface 502 and a skip link FIFO buffer 508 is coupled to the first skip link interface 504. The first direct link interface 502 and the first skip link interface 504 receive data from the direct link 108 and the skip link 108, respectively, and store the received data in the direct link FIFO buffer 506 and the skip link FIFO buffer 508, respectively.

The current node 102 includes a second direct link interface 510 that communicatively couples the current node 102 to the clockwise direct link 108 of channel 0, which is connected to the current node's clockwise neighbor. The current node 102 also includes a second skip link interface 512 that communicatively couples the current node 102 to the clockwise skip link 108 of channel 0, which is connected to the current node's clockwise neighbor's neighbor.

In the example shown in FIG. 5, the current node 102 includes a de-skew and compare module 514 that "de-skews" and compares the frames received from the current node's counter-clockwise neighbor and counter-clockwise neighbor's neighbor. In the particular example shown in FIG. 5, the current node 102 includes a single transmitter 516 that is used to transmit data to both the current node's clockwise neighbor and the current node's clockwise neighbor's neighbor. The output of the transmitter 516 is coupled to both the second direct link interface 510 and the second skip link interface 512 in order to transmit to the current node's clockwise neighbor and the current node's clockwise neighbor's neighbor, respectively.

For given transmission during a given time slot, the current node 102 will typically receive start receiving respective frames on the first direct link interface 502 and the first skip link interface 504 at different times. For example, where the comparison and relaying processing is performed in connection with blocks 406-410 and 414-418 of FIG. 4, the current node 102, for a given transmission, will typically start receiving a frame on the first skip link interface 504 before the current node 102 starts receiving a corresponding frame on the first direct link interface 502. This is because, in such an example, the frame received at the first skip link interface 504 travels through one less hop than the frame received on the first direct link interface 502 (that is, the frame received on the first skip link interface 504 "skips" the current node's counter-clockwise neighbor).

In the example shown in FIG. 5, the de-skew and compare module 514 and the transmitter 516 wait until both FIFO buffers 506 and 508 are half full before performing the comparison and relaying of the received data. In other embodiments, other de-skew techniques are used in addition to or instead of the one described above.

In the particular example shown in FIG. 5, a bit-by-bit comparison of the two received frames is performed by the de-skew and compare module 514.

As data is received at the first direct link interface 502, the received data is written into the input end of the direct link FIFO buffer 506. Also, as data is received at the skip link interface 504, the received data is written into the input end of the skip link FIFO buffer 508. The determination as to whether a frame is being received on the first direct link interface 502 is made by detecting a start-of-frame delimiter in the data received from that interface 502. Likewise, the determination as to whether a frame is being received on the first skip link interface 504 is made by detecting a start-of-frame delimiter in the data received from that interface 504.

If a frame is being received on both the first direct link interface 502 and the first skip link interface 504, when both FIFO buffers 506 and 508 are half full, the de-skew and compare module 514 starts receiving bits from the respective outputs ends of the first and second FIFO buffers 506 and 508 and the transmitter 516 start receiving bits from the output end of the FIFO buffer 506. The de-skew and compare module 514, as it receives bits from the first and second FIFO buffers 506 and 508, performs the bit-by-bit comparison of the two received frames. The transmitter 516, as it receives bits from the first FIFO buffer 506, relays the received bits along channel 0 to the counter-clockwise neighbor and counter-clockwise neighbor's neighbor. When the de-skew and compare module 514 has compared the end of both frames, the de-skew and compare module 514 outputs, to the transmitter 516, a bit that indicates whether the two frames were or were not identical. The transmitter 516 receives the bit output by the de-skew and compare module 514 and "appends" the bit to the end of the relayed frame by transmitting the bit after the relayed frame.

If a frame is being received on the first direct link interface 502 but not on the first skip link interface 504, when the first FIFO buffer 506 is half full, the de-skew and compare module 514 and the transmitter 516 start receiving bits from the output end of the first FIFO buffer 506. The de-skew and compare module 514 outputs, to the transmitter 516, a bit that indicates that a mismatch has occurred for channel 0 at the current node 102. The transmitter 516, as it receives bits from the first FIFO buffer 506, relays the received bits along channel 0 to the counter-clockwise neighbor and counter-clockwise neighbor's neighbor. The transmitter 516 receives the bit output by the de-skew and compare module 514 and "appends" the bit to the end of the relayed frame by transmitting the bit after the relayed frame.

In the case of processing performed for method 400 of FIG. 4, if a frame is being received on the first skip link interface 504 but not on the first direct link interface 502, when the second FIFO buffer 508 is half full, the de-skew and compare module 514 and the transmitter 516 start receiving bits from the output end of the second FIFO buffer 508. The de-skew and compare module 514 outputs, to the transmitter 516, a bit that indicates that a mismatch has occurred for channel 0 at the current node 102. The transmitter 516, as it receives bits from the second FIFO buffer 508, relays the received bits along channel 0 to the counter-clockwise neighbor and counter-clockwise neighbor's neighbor. The transmitter 516 receives the bit output by the de-skew and compare module 514 and "appends" the bit to the end of the relayed frame by transmitting the bit after the relayed frame.

Embodiments of network 100 provide improved fault tolerance while the nodes 102 of the network 100 are operating in a synchronous mode. For example, embodiments of network 100 provide improved transport availability and improved transport integrity. Improved transport availability is provided by, for example, the use of the two, independent opposing communication channels 0 and 1. Data that is transmitted by a node 102 in the network 100 travels to each of the other nodes 102 in the network 100 via two independent communication paths. For example, data transmitted by node A of the network 100 travels to node E via a first path traveling counter-clockwise on channel 0 from node A to nodes B, C, D, and E and via a second path traveling clockwise on channel 1 from node A to nodes H, G, F, and E. As a result, despite any single point of failure on one of these paths, there will be another path by which data can successfully travel to node E.

In the embodiment shown in FIGS. 1-4, a CRC protocol field is included in each frame that is transmitted around the network 100. Such CRC fields are well-suited for addressing random errors. Errors resulting from noise on the direct links 108 between a transmitting node and the transmitting node's clockwise neighbor and counter-clockwise neighbor have such a random nature. However, errors introduced by an active inter-stage may be correlated in nature, such that a CRC field may not be well-suited for addressing such errors. The bit-by-bit comparison performed by a node 102 when performing the processing of method 400 will detect any errors introduced by a previous node, thereby addressing such active inter-stage induced errors. Relaying in this manner improves transport integrity in the network 100.

Figure 6:
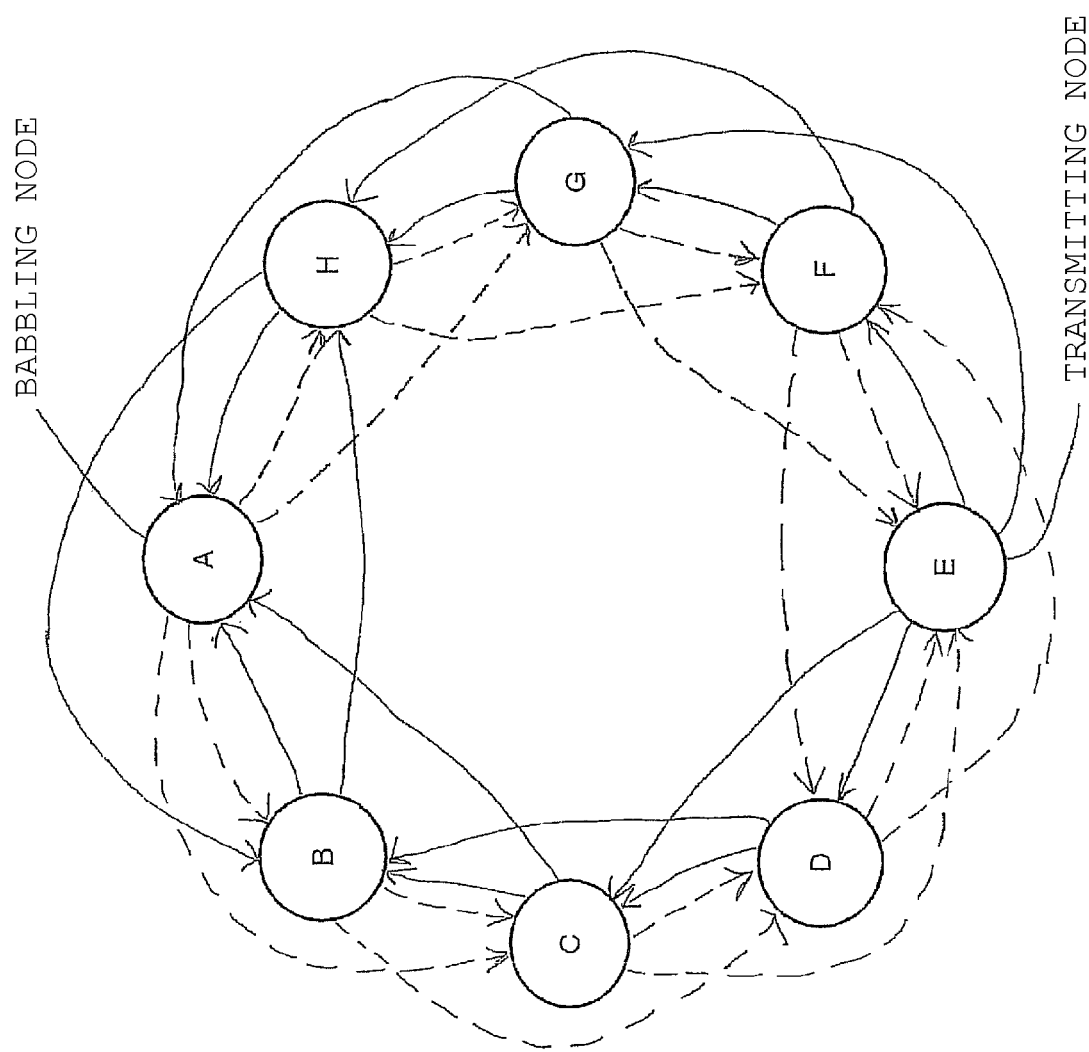
FIG. 6 is block diagram illustrating one example of a babbling node fault occurring in the network of FIG. 1 while such nodes are operating in a synchronized mode.

FIG. 6 is block diagram illustrating one example of a babbling node fault occurring in the network 100 of FIG. 1 while such nodes 102 are operating in a synchronized mode. In the example shown in FIG. 6, each node 102 in the network 100 implements the methods 200, 300, and 400 of FIG. 24. In this example, node A has a babbling node fault during the time slot in which node F is scheduled to transmit. The fault causes node A to transmit to node A's clockwise neighbor node H along channel 0 and to node A's counterclockwise neighbor node B along channel 1. When node H receives from channel 0 the frame transmitted by node A, the comparison that node H performs between the frame received from node A (node H's counterclockwise neighbor) and the frame received from node B (node H's counterclockwise neighbor's neighbor) will indicate that the two frames are not identical. As result, node H relays on channel 0 the frame received from node A along with information indicating that a mismatch occurred at node H. Likewise, when node B receives from channel 1 the frame transmitted by node A, the comparison that node B performs between the frame received from node A (node B's clockwise neighbor) and the frame received from node B (node B's clockwise neighbor's neighbor) will indicate that the two frames are not identical. As a result, node B relays on channel 1 the frame received from node A along with information indicating that a mismatch occurred at node H.

The links 108 of channel 0 and channel 1 that are affected by node A's transmission are shown in FIG. 6 using dashed lines. The direct link 108 in channel 0 from node A to node H and the direct and skip links 108 in channel 0 from nodes H to node G, from node G to node F, and from node F to node E are affected by the faulty transmission by node A. The direct link 108 in channel 1 from node A to node B and the direct and skip links 108 in channel 1 from node B to node C, from node C to node D, and from node D to node E are affected by the faulty transmission by node A.

Data transmitted by node F along channel 0 is received and relayed by nodes D, C, and B because the links 108 in this part of channel 0 are not affected by node A's transmissions. Likewise, data transmitted by node F along channel 1 is received and relayed by nodes F, G, and H because the links 108 in this part of channel 1 are not affected by node A's transmissions. The links 108 of channel 0 and channel 1 that are not affected by node A's transmissions and over which node F is able to transmit successfully are shown in FIG. 6 using solid lines. In this way, data transmitted by node F is able to reach each of the nodes 102 in the ring 104 despite the babbling node fault occurring at node A.

In another example, a slightly-off-specification (SOS) failure or fault occurs in the communication network 100 of FIG. 1 while the nodes 102 are operating in a synchronized mode. A SOS fault occurs when a frame is received within the receive window of some nodes 102 in the network 100 and slightly outside the receive window of other nodes 102 in the network 100. Upon the occurrence of an SOS failure, the former set of nodes 102 accept the frame as a correct frame while the latter set of nodes 102 reject the frame as an incorrect frame. In other words, different sets of correct nodes 102 in the network 100 will have a different view of the same frame, which is undesirable.

In this example, a SOS failure occurs in node A. In such a failure, during the time slot assigned to node A for node A to transmit, faulty node A transmits at a point in time that would (if node A's transmissions were relayed fully around the ring 104) result in nodes B, C, H and G receiving the transmission as correct and nodes D, E, and F receiving the transmission as incorrect.

Nodes B and H, as neighbors of node A, will check if the transmission by node A complies with the temporal policy implemented in the network 100. In such an example, node B will determine that the frame received from node A on channel 1 does not comply with the temporal policy and, therefore, will not relay the frame any further along channel 1. Likewise, node H will determine that the frame received from node A on channel 0 does not comply with the temporal policy and, therefore, will not relay the frame any further along channel 0. In this way, the impact of such SOS failures is reduced.

When operating in an unsynchronized mode, the nodes 102 have not yet synchronized to a global time base and are not yet transmitting in accordance with a TDMA schedule. Thus, the nodes 102 of the network 100 must take steps to deal with transmission collisions. FIGS. 7A-7B are flow diagrams of one embodiment of a method 700 of communicating in the network 100 of FIG. 1 while operating in an unsynchronized mode. In such an embodiment, each node 102 in the network 100 performs the processing of method 700 when that node 102 is operating in an unsynchronized mode. In the context of FIGS. 7A-7B, the node 102 performing the processing of method 700 is referred to here as the "current" node 102. In one embodiment, at least a portion of the functionality described here as being performed by the current node 102 is implemented in a controller included in the node 102. Other embodiments of method 700 are implemented in other ways.

The particular embodiment of method 700 shown in FIGS. 7A-7B performed by the current node 102 when that node "wakes up" (checked in block 702 of FIG. 7). For example, the current node 102 wakes up when that node 102 is initially powered-on or after the node 102 has been reset. When the current node 102 wakes up, the current node 102 does not relay any data that the current node 102 receives from any of the links 108 for a predetermined period of time (block 704). That is, the current node 102 "blocks" any transmissions made by other nodes 102 in the network 100 by not relaying the data from such transmissions any further along the channels 0 and 1 of the network 100. The predetermined period of time for which the current node 102 blocks such transmissions is also referred to here as the "first block period." In one implementation of such an embodiment where the TTP/C protocol is used, the first block period is set to the minimal inter-frame gap (IFG).

After the first block period has elapsed, the current node 102 stops blocking all transmissions that are received by the current node 102. When the current node 102 receives data from the counter-clockwise neighbor of the current node 102 on channel 0 via the direct link 108 (checked in block 706), the current node 102 checks if the counter-clockwise neighbor sourced the received data (block 708). In one embodiment, the current node 102 makes this determination by checking, for a predetermined "comparison" period of time, if the current node 102 is receiving the same data from the current node's counter-clockwise neighbor's neighbor on channel 0 as the current node 102 is receiving from the counter-clockwise neighbor on channel 0. If the current node 102 determines that it is not receiving the same data from the current node's counter-clockwise neighbor's neighbor on channel 0, the current node 102 concludes that the counter-clockwise neighbor is the source of the data being received from that neighbor. If the current node 102 determines that it is receiving the same data from the current node's counter-clockwise neighbor's neighbor on channel 0, the current node 102 concludes that the counter-clockwise neighbor is not the source of the data being received from that neighbor.

If the counter-clockwise neighbor did not source the data being received from that neighbor, the current node 102 relays that data along channel 0 to the current node's clockwise neighbor node and clockwise neighbor's neighbor (block 710).

If the counter-clockwise neighbor sourced the data being received from that neighbor, the current node 102, for a predetermined period of time, relays data received on channel 0 that was sourced by the counter-clockwise neighbor (block 712). This predetermined period of time is also referred to here as the "relay period." In one implementation of such an embodiment where the TTP/C protocol is used, the relay period is at least long enough for a cold start message to be transmitted around the network 100. The current node 102 relays such data along channel 0 to the current node's clockwise neighbor node and clockwise neighbor's neighbor. During the relay period, the current node 102 does not relay any data received on channel 0 that was sourced by a node other than the current node's counter-clockwise neighbor.

When the relay period has elapsed (checked in block 714), the current node 102 does not relay, for a predetermined period of time, data received on channel 0 that was sourced by the counter-clockwise neighbor. This predetermined period of time is also referred to here as the "second block period." In one implementation of such an embodiment where the TTP/C protocol is used, the relay period is at least long enough for another node 102 in the network 100 to initiate the transmission of a cold start message. During the second block period, if the current node 102 receives data on channel 0 that was not sourced by the counter-clockwise neighbor, the current node 102 relays the received data along channel 0 to the current node's clockwise neighbor node and clockwise neighbor's neighbor (block 716). In the embodiment shown in FIGS. 7A-7B, the current node 102 determines if data received on channel 0 was sourced by the counter-clockwise neighbor by comparing the data received from the counter-clockwise neighbor to any corresponding data received from the current node's counter-clockwise neighbor's neighbor on channel 0.

After the second block period elapses (checked in block 718), the current node 102 ceases blocking data received on channel 0 that was sourced by the counter-clockwise neighbor (looping back to 706).

Similar processing is performed for channel 1 after the first block period has elapsed. After the first block has elapsed, when the current node 102 receives data from the counter-clockwise neighbor of the current node 102 on channel 1 via the direct link 108 (checked in block 720 of FIG. 7B), the current node 102 checks if the clockwise neighbor sourced the received data (block 722). In one embodiment, the current node 102 makes this determination by checking, for a predetermined period of time, if the current node 102 is receiving the same data from the current node's clockwise neighbor's neighbor on channel 1 as the current node 102 is receiving from the clockwise neighbor on channel 1. If the current node 102 determines that it is not receiving the same data from the current node's clockwise neighbor's neighbor on channel 1, the current node 102 concludes that the clockwise neighbor is the source of the data being received from that neighbor. If the current node 102 determines that it is receiving the same data from the current node's clockwise neighbor's neighbor on channel 1, the current node 102 concludes that the clockwise neighbor is not the source of the data being received from that neighbor.

If the clockwise neighbor did not source the data being received from that neighbor, the current node 102 relays that data along channel 1 to the current node's counter-clockwise neighbor node and counter-clockwise neighbor's neighbor (block 724).

If the clockwise neighbor sourced the data being received from that neighbor, the current node 102, for the relay period, relays data received on channel 1 that was sourced by the clockwise neighbor (block 726). The current node 102 relays such data along channel 1 to the current node's counter-clockwise neighbor node and counter-clockwise neighbor's neighbor. During the relay period, the current node 102 does not relay any data received on channel 1 that was sourced by a node other than the current node's clockwise neighbor.

When the relay period has elapsed (checked in block 728), the current node 102 does not relay, for the second block period, data received on channel 1 that was sourced by the clockwise neighbor. During the second block period, if the current node 102 receives data on channel 1 that was not sourced by the clockwise neighbor, the current node 102 relays the received data along channel 1 to the current node's counter-clockwise neighbor node and counter-clockwise neighbor's neighbor (block 730). In the embodiment shown in FIGS. 7A-7B, the current node 102 determines if data received on channel 1 was sourced by the clockwise neighbor by comparing the data received from the clockwise neighbor to any corresponding data received from the current node's clockwise neighbor's neighbor on channel 1. After the second block period has elapsed (checked in block 732), the current node 102 ceases blocking data received on channel 1 that was sourced by the clockwise neighbor (looping back to 720).

The following describes one example of the operation of method 700. In this example, the current node 102 is node A and the nodes 102 in the network 100 are operating in an unsynchronized mode (for example, during initial system startup). When node A first powers on and wakes up, node A does not relay any data it receives for the first block period. After the first block period has elapsed, node A receives data from node B on channel 0 (that is, from node A's counter-clockwise neighbor). In this example, node B sourced the received data because node A did not receive, within the predetermined comparison period, the same data from node C (node A's counter-clockwise neighbor's neighbor). Node A (the current node 102 in this example) relays data received from node B for the relay period. During the relay period, node A does not relay any data received by node A that was sourced by nodes other than node B. After the relay period elapses, for the second block period, node A does not relay data received on channel 0 that was sourced by node B and relays data received on channel 0 that was sourced from a node other than node B. After the second block period has elapsed, node B ceases blocking data receiving on channel 0 that was sourced by node B.

In such an example, if node B has a babbling node fault that causes node B to source data continuously, the current node 102 (node A) will limit the impact of node B's fault by blocking node B's transmission during the second block period and instead relaying data sourced by other nodes in the network 100.

In other embodiments, one or more of the first and second block periods and the relay period are configurable.

In other embodiments, instead of blocking or relaying data received at the current node 102 based on whether that data was sourced from a respective neighbor, the current node 102 relays the data regardless of whether such data was sourced from a respective neighbor and includes, with the relayed data, information indicating whether the relayed data was or was not sourced by the respective neighbor of the current node 102. In one such embodiment, the comparison functionality described above in connection with FIGS. 2-5 is used to generate such information. For example, in one implementation of such an embodiment, a one-bit field is appended to the relayed data that indicates whether or not the respective neighbor of the current node 102 sourced the relayed data. These appended fields can be used, for example, as a "hop count" in source identification processing.

In other embodiments, the current node 102, upon detecting that data received at the current node 102 was sourced by a neighbor, determines if the transmission complies with one or more policies implemented in the network 100 and, if such transmission does not comply with one or more such policies, either does not relay the received data or relays the data along with the information indicating non-compliance with such policies (for example, by appending a one-bit integrity field or by altering a shared integrity field included in the data).

Because channels 0 and 1 comprise segmented media, there is a possibility that multiple "cliques" may form in the network 100 at, for example, system power up. FIG. 8 illustrates an exemplary scenario in which two cliques form in the network 100 of FIG. 1. Each of the cliques has a separate TDMA schedule 802 or 804 according to which the nodes 102 in the respective clique transmit. In this example, the time slots in the both schedules 802 and 804 are the same size and the schedules 802 and 804 are almost 180 degrees out of phase with each other. Schedule 802 is associated with a clique that includes nodes A, H, G, and F (also referred to here as the "clique 1") and schedule 804 is associated with a clique that includes nodes E, B, C, and D (also referred to here as the "clique 2"). The order in which the nodes 102 in the network transmit is node A, node E, node H, node B, node G, node C, node F, and node D, with each of the nodes E, B, C, and D starting its transmission one-half slot behind each of nodes A, H, G, and F, respectively.

In this example, the two cliques 802 and 1204 remain stable and completely unaware of each other. It should be noted that the normal clique avoidance function of, for example, the TTP/C protocol would likely not be sufficient to resolve such a clique formation as the "noise" observed on only one of the links from the opposing clique would be offset by the successful reception of a message in every slot.

FIG. 9 is flow diagram of one embodiment of a method 900 of resolving cliques in a network 100 of FIG. 1. The embodiment of method 900 shown in FIG. 9 is suitable for resolving the cliques formed in the example shown in FIG. 8. Although the embodiment of method 900 shown in FIG. 9 is described here as being implemented using the network 100 shown in FIG. 1, other embodiments are implemented in other networks and in other ways. Method 900 is suitable for use when the nodes 102 in the ring 104 are operating in a synchronized mode in which two or more cliques have formed. In the context of FIG. 9, the node 102 that is performing the processing of method 900 is referred to here as the "current" node 102. In one embodiment, at least a portion of the functionality described here as being performed by the current node 102 is implemented in a controller included in the node 102. Other embodiments of method 900 are implemented in other ways.

The functionality of method 900 is used when the current node 102 is operating in a synchronous mode (that is, when the nodes 102 in each clique are transmitting according to a TDMA schedule). While operating in synchronous mode, the current node 102 listens in a synchronous manner for data from the both of the current node's neighbor (block 902). That is, the current node 102 listens for frames from its clockwise neighbor on channel 1 and for frames from its counter-clockwise neighbor on channel 0 during the time slots defined by the current transmission schedule recognized by the current node 102. The current node 102 determines if it has not received a valid frame from either of the current node's neighbors for a predetermined period of time (checked in block 904). A neighbor from which the current node 102 has not received a valid frame for the given period of time is referred to here as a "silent neighbor." A "valid" frame is a frame that is syntactically correct and that is in agreement with the current node's schedule position. In one embodiment, the validity of schedule alignment may be validated by explicit schedule data transmitted within the contents of a frame. In another embodiment, the schedule position data may be sent implicitly in the contents of a frame (for example, as described in the H0005061 Application).

When the current node 102 has not received a valid frame for the given period of time from a silent neighbor, the current node 102 listens asynchronously for data from the silent neighbor's neighbor for the given period of time (block 906). For example, in one implementation of such an embodiment, the given period of time is equal to one TDMA round. In another embodiment, this time period is zero (that is, the current node 102 continuously listens in an asynchronous mode for valid frames from the current node's neighbor's neighbors on the skip links 108).

When the current node 102 listens asynchronously for data from such a silent neighbor's neighbor, the current node 102 will be able to receive any syntactically valid frame sent from the silent neighbor's neighbor irrespective of transmission time or phase. As a result, the current node 102 will be able receive messages from a clique of which the current node 102 is not a member. If the current node 102 does not receive a valid frame from the silent neighbor's neighbor within the given period of time while listening asynchronously, the current node 102 remains in the clique of the current node 102 is currently a member (also referred to here as the "current clique") (block 920).

When the current node 102 receives a valid frame from the silent neighbor's neighbor while listening asynchronously (checked in block 908), the current node 102 asynchronously listens for a second valid frame from the silent neighbor for the given period of time (block 910). If the current node 102 does not receive a valid from the silent neighbor within the given period of time while listening asynchronously (checked in block 912), the current node 102 remains in the current clique (block 920). If the current node 102 receives a valid frame from the silent neighbor while listening asynchronously, the current node 102 checks if the two asynchronous frames indicate that they were transmitted from the same clique (block 914). In one embodiment, the current node 102 checks if the two asynchronous frames were transmitted from nodes that are members of the same clique. In another embodiment, the current node 102 checks if the time observed between the two asynchronous receptions of the two asynchronous frames is in agreement with the expected time between the respective scheduled transmissions as indicated, for example, by frame schedule position data embedded within the two asynchronous frames. In other embodiments, other frame coherency checks may be performed in addition to or instead of these checks.

If the current node 102 does not receive two asynchronous frames that indicate that they were transmitted from the same clique, the current node 102 remains in the current clique (block 920).

If the two asynchronous frames indicate that they were transmitted from the same clique (also referred to here as the "other clique), then the current node 102 determines if the current node 102 should defect from the current clique towards the other clique (block 916). If the current node 102 determines that it should defect, the current node 102 defects from the current clique with a bias towards the other clique (block 918). Otherwise, the current node 102 remains in the current clique (block 920).

In one embodiment, the current node 102 determines if it should defect from the current clique towards the other clique by comparing the size of the current clique (that is, the number of nodes that are members of the current clique) to the size of the other clique (that is, the number of nodes that are members of the other clique). If the other clique is larger than the current clique, the current node 102 defects from the current clique towards the other clique. If the other clique is not larger than the current clique, the current node 102 remains in the current clique. In one implementation of such an embodiment, the size of the other clique is determined using explicit clique-size information included in the two asynchronous frames. In another implementation, the size of the other clique size is determined using information that is implicitly sent with the two asynchronous frames (for example, as described in the H0005061 Application). In another implementation, the size of the other clique is derived from other information sent within the two asynchronous frames (for example, a membership vector). In another implementation, the current node 102 listens asynchronously for transmission from the other clique for an entire TDMA round and thereafter derives the size of the other clique based on the number of transmission the current node 102 received during the TDMA round.

Figure 10:
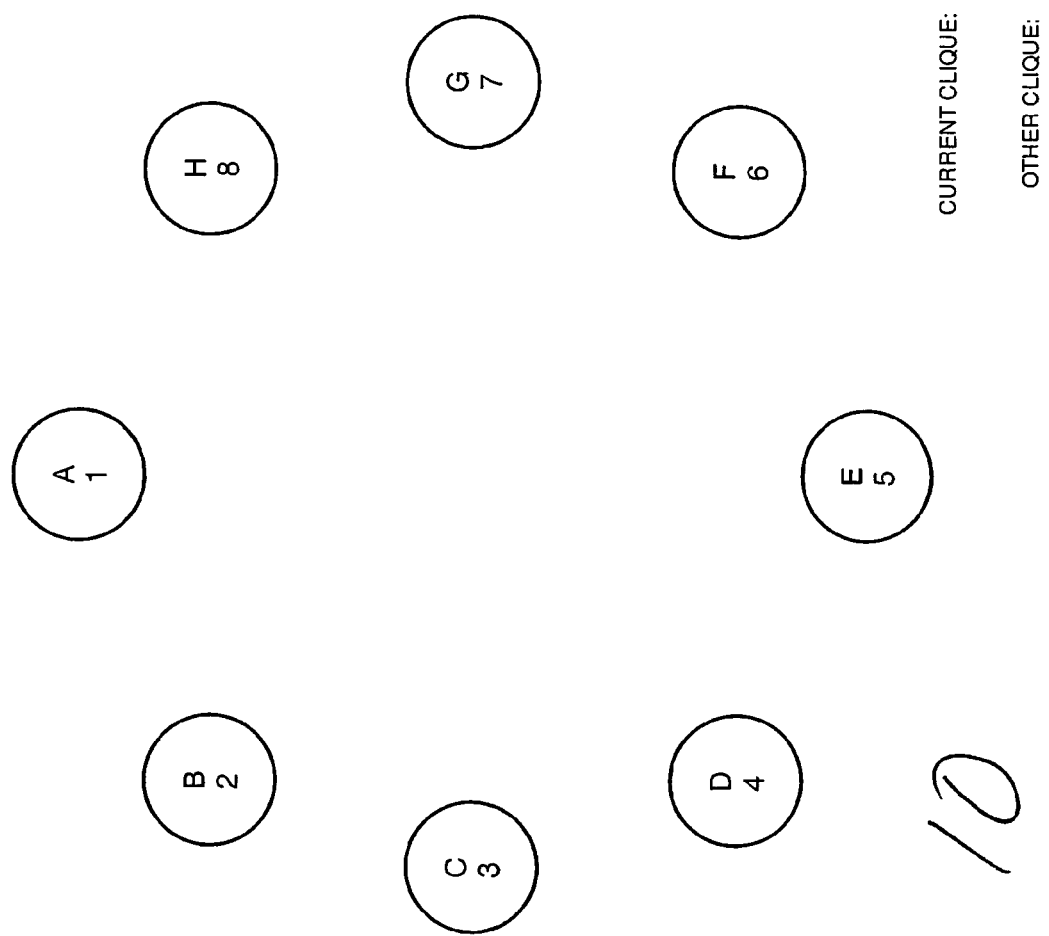
FIG. 10 is a block diagram illustrating one example of the operation of the method of FIG. 9 using an a priori ordering of the nodes of the network of FIG. 1.

In another embodiment, the current node 102 determines if it should defect from the current clique towards the other clique based on an a priori ordering of the nodes 102 in the network 100. The current node 102 determines if it should defect by determining which member node of the current clique comes first in the assigned order and by determining which member node of the other clique comes first in the assigned order. The current node 102 defects from the current clique towards the other clique if the first node of the other clique comes before the first node of the current clique in the order assigned to the nodes 102 of the network 100. FIG. 10 is a block diagram illustrating one example of the operation of such an implementation. In the example shown in FIG. 10, the nodes 102 of network 100 are ordered in the following order: node A, node B, node C, node D, node E, node F, node G, and node H. In this example, the other clique includes the nodes that are members of clique 1 shown in FIG. 8 and the current clique includes the nodes that are members of clique 2 shown in FIG. 8. The first node of the other clique (node A) comes before the first node of the current clique (node B) and, therefore, the current node 102 would defect from the current clique towards the other clique in this example.

In one such embodiment, the current node 102 uses such an a prior ordering to determine if the current node 102 should defect from the current clique towards the other clique only when the current clique and other clique are of the same size (that is, have the same number of member nodes).

Figure 11:
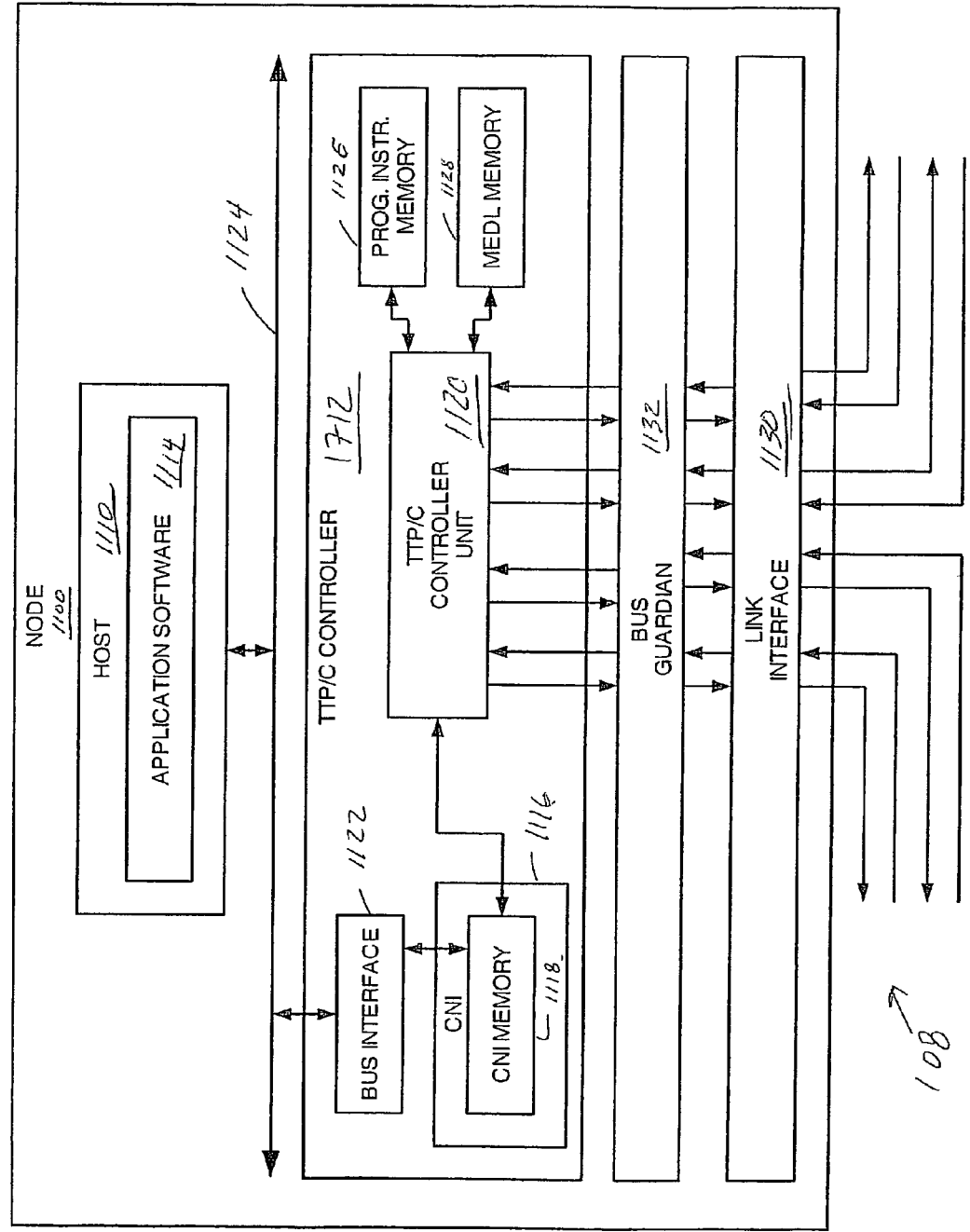
FIG. 11 is a block diagram of one embodiment of a node that is suitable for implementing each node of the network shown in FIG. 1.

The systems, devices, methods, and techniques described here can be implemented nodes that implements various types of protocols (for example, time triggered protocols such as TTP/C or FLEXRAY) FIG. 11 is a block diagram of one exemplary embodiment of a node 1100 that is suitable for implementing each node 102 of the network 100 shown in FIG. 1. The node 1100 shown in FIG. 11 implements the TTP/C protocol (though it is to be understood that the systems, devices, methods and techniques described here can be implemented using other protocols instead of or in addition to the TTP/C protocol). Each node 1100 includes a host 1110 and a TTP/C controller 1112. The host 1110 executes application software 1114 that provides the data that is communicated over the network 100. For example, in one implementation, the host 1110 is a computer executing a safety-critical control application. The host 1110 communicates with the other nodes 102 in the communication network 100 using the TTP/C controller 1112. The TTP/C controller 1112 implements the functionality of the TTP/C protocol. The TTP/C protocol provides three basic services to the application software 1114 executing on the host 1110. The TTP/C protocol provides deterministic message sending, a global time base, and membership service so that each node 1100 knows which node is currently transmitting.

The TTP/C controller 1112 includes a communication network interface (CNI) 1116 that serves as an interface between the host 1110 and the other components of the TTP/C controller 1112. In the embodiment shown in FIG. 11, the CNI 1116 is implemented using a dual-ported memory 1118 (also referred to here as the "CNI memory 1118). The CNI memory 1118 is accessed by the host 1110 and by a TTP/C controller unit 1120 included in the TTP/C controller 1112. In one implementation of such an embodiment, the CNI memory 1118 is implemented using a static random access memory (SRAM). A bus interface 1122 couples the CNI memory 1118 to buses 1124 (for example, data, address, and/or control buses) over which the host 1110 reads and writes data from and to the CNI memory 1118. In other embodiments, the CNI memory 1118 is accessed in other ways (for example, using a serial interface).

The TTP/C controller unit 1120 provides functionality necessary to implement the TTP/C protocol. In one implementation of such an embodiment, the TTP/C controller unit 1120 is implemented using a programmable processor (for example, a microprocessor) that is programmed with instructions to carry out the functionality performed by the TTP/C controller unit 1120. In such an embodiment, instruction memory 1126 is coupled to the TTP/C controller unit 1120. Program instructions that are executed by the TTP/C controller unit 1120 are stored in the program instruction memory 1126. In one implementation, the program memory 1126 is implemented using a read only memory device or a non-volatile memory device such as a flash memory device.

The TTP/C controller 1112 also includes message descriptor list (MEDL) memory 1128 in which configuration information for a time-division multiple access (TDMA) schedule, operating modes, and clock synchronization parameters are stored. The MEDL memory 1128 is typically implemented using, for example, a flash memory device and/or static random access memory (SRAM) device. Both the size of the CNI memory 1118, the program memory 1126, and the MEDL memory 1128 are selected based on the specific needs of the application software 1114 executing on the host 1110, the program instructions executing on the TTP/controller unit 1120, and/or a bus guardian 1132 (described below). Moreover, although the CNI memory 1118, the program memory 1126, and the MEDL memory 1128 are shown in FIG. 11 as separate components, in some embodiments the CNI memory 1118, the program memory 1126, and/or the MEDL memory 1128 are combined into one or more memory devices.

A single bus guardian 1132 servers as an interface between the TTP/C controller 1112 and the links 1108. In one implementation of the embodiment shown in FIG. 11, the bus guardian 1132 includes, for example, one or more universal asynchronous receiver/transmitter (UART) devices that are used to receive data from and transmit and relay data over the serial, unidirectional point-to-point, unidirectional links 108 shown in FIG. 1.

Data received by the bus guardian 1132 from the links 108 is passed to the TTP/C controller 1112 for processing thereby in accordance with the TTP/C protocol. Data that is to be transmitted by the TTP/C controller 1112 is passed by the TTP/C controller unit 1120 to the bus guardian 1132. The bus guardian 1132 determines when the TTP/C controller 1112 is allowed to transmit on the links 108 and when to relay data received from the links 108. In one implementation, the bus guardian 1112 implements at least a portion of the functionality described above in connection with FIGS. 2 and 3. The bus guardian 1132 accesses the MEDL information stored in the MEDL memory 1128 of the TTP/C controller 1120 in order to determine when to transmit and relay data. Thus, the bus guardian 1132 included in each node 102 serves as a bus guardian 1132 for that node 102 and for each of that node's neighbors. In this way, fault-tolerance associated with multiple bus guardians can be achieved for the nodes 102 in the network 100 while only using a single bus guardian 1132 in each node 102.

Although the TTP/C controller 1112 and the bus guardian 1132 are shown as separate components in FIG. 11, it is to be understood that in one implementation of such an embodiment, the functionality provided by the TTP/C controller 1112 and the bus guardian 1132 are integrated into a single integrated circuit device. In such an implementation, additional resource savings (for example, cost, space, and power) can be achieved. In one such implementation, a programmable processor is programmed with appropriate program instructions that, when executed by the programmable processor, carry out at least a portion of the functionality described here as being performed by the TTP/C controller 1112 and the bus guardian 1132. In other embodiments and implementations, the TTP/C controller 1112 (or one or more components thereof) and the bus guardian 1132 (or one or more components thereof) are implemented using separate components.

Figure 12:
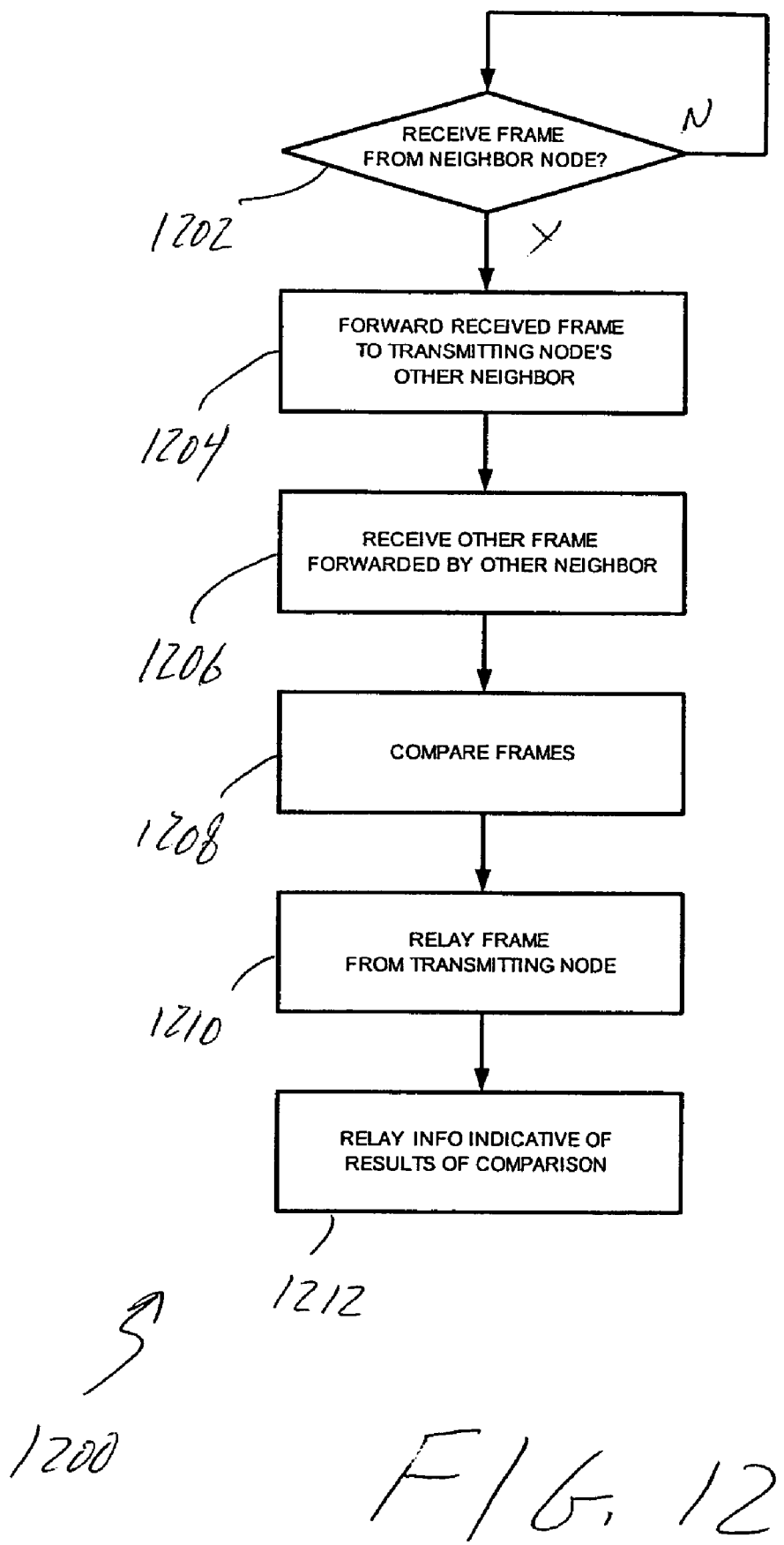
FIG. 12 is a flow diagram of one embodiment of a method of detecting directional integrity in the network of FIG. 1.

FIG. 12 is a flow diagram of one embodiment of a method of detecting directional integrity in the network 100 of FIG. 1. Although the embodiment of method 1200 shown in FIG. 12 is described here as being implemented using the network 100 shown in FIG. 1, other embodiments are implemented in other networks and in other ways. In the context of FIG. 12, the node 102 that is performing the processing of method 1200 is referred to here as the "current" node 102. In one embodiment, at least a portion of the functionality described here as being performed by the current node 102 is implemented in a controller included in the node 102. Other embodiments of method 1200 are implemented in other ways.

When a given node 102 (referred to here in the context of FIG. 12 as the "transmitting" node 102) transmits data, each of the neighbor nodes of the transmitting node 102 perform method 1200 in order to determine if the transmitting node 102 is transmitting the same data on both channels 0 and 1 of the network 100 (that is, whether there the transmitting node 102 is transmitting with directional integrity). Method 1200 can be performed, for example, when the nodes 102 in the network 100 are operating in a synchronized mode in which the nodes transmit in accordance with a TDMA schedule. In such an embodiment, method 1200 can be performed by the neighbor nodes in addition to the processing described above in connection with FIG. 3A or FIG. 3B. Method 1200 can also be performed, for example, when the nodes 102 in the network 100 are operating in an unsynchronized mode (for example, during system startup). In such an embodiment, method 1200 can be performed in addition to the processing described above in connection with FIGS. 7A-7B.

When the transmitting node 102 transmits, both neighbors of the transmitting node exchange the respective frames they receive from the transmitting node over the skip links 108 that communicatively couple the neighbors to one another. As shown in FIG. 12, when the current node 102 receives a frame sourced from one of its neighbors (checked in block 1202), the current node 102 forwards the frame it is receiving from that neighbor (that is, from the transmitting node) to the other neighbor of the transmitting node (block 1204). The current node 102 receives the frame from the transmitting node 102 from the direct link 108 that communicatively couples the current node 102 to the transmitting node. In the context of claim 12, the channel on which the current node 102 receives the frame from the transmitting node 102 is referred to here as the "current channel." The current node 102 forwards the frame it receives from the transmitting node to the other neighbor of the transmitting node 102 over the skip link 108 that communicatively couples the current node 102 to the other neighbor in channel other than the current channel.

The other neighbor of the transmitting node forwards the frame it receives from the transmitting node to the current node 102 over the other skip link 108 that communicatively couples the other neighbor to the current node 102 in the current channel. In the context of FIG. 12, the frame forwarded to the current node 102 by the other neighbor of the transmitting node is also referred to here as the "other frame." The current node 102 receives the other frame (block 1206). The current node 102 compares the frame it is receiving from the transmitting node to the other frame it is receiving from the other neighbor (block 1208). In one embodiment, this comparison is a bit-for-bit comparison.

The current node 102 relays the frame it is receiving from the transmitting node 102 along the current channel (block 1210). For example, when the transmitting node 102 is the clockwise neighbor of the current node 102, the current node 102 receives the frame from the transmitting node 102 via channel 1 and relays the received frame along channel 1 to the counter-clockwise neighbor and neighbor's neighbor of the current node 102. When the transmitting node 102 is the counter-clockwise neighbor of the current node 102, the current node 102 receives the frame from the transmitting node 102 via channel 0 and relays the received frame along channel 0 to the clockwise neighbor and neighbor's neighbor of the current node 102.

After the entire frame transmitted by the transmitting node has been relayed by the current node 102 and the comparison between that frame and the other frame forwarded to the current node 102 by the other neighbor is complete, the current node 102 relays information indicative of the results of that comparison in or after the frame received from the transmitting neighbor along the current channel (block 1212). In one embodiment, the information indicative of the results of the comparison comprises a one-bit, appended integrity field that the current node 102 appends to the frame received from the transmitting node in the manner described above in connection with FIGS. 4A-4B and 5. In another embodiment, a shared integrity field is included at the end of each frame in the manner described above in connection with FIGS. 4A-4B and 5.

For example, where the transmitting node is node A of FIG. 1 and the current node is node B, the other neighbor of the transmitting node is node H. In such an example, the current node (node B) forwards the frame it receives from node A to the other neighbor (node H) over the skip link 108 of channel 0, which communicatively couples node B to node H. Likewise, the other neighbor (node H) forwards the frame it receives from node A to the current node (node B) over the skip link 108 of channel 1, which communicatively couples node H to node B. Node B compares the frame it receives from node A to the frame it receives from node H. Node B relays the frame received from node A along channel 1 to node C (the counter-clockwise neighbor of node B) and to node D (the counter-clockwise neighbor's neighbor of node B). When the node B has relayed the entire frame received from node A and has completed the comparison, node B appends (in this example) a one-bit field to the relayed frame.

Figure 13:
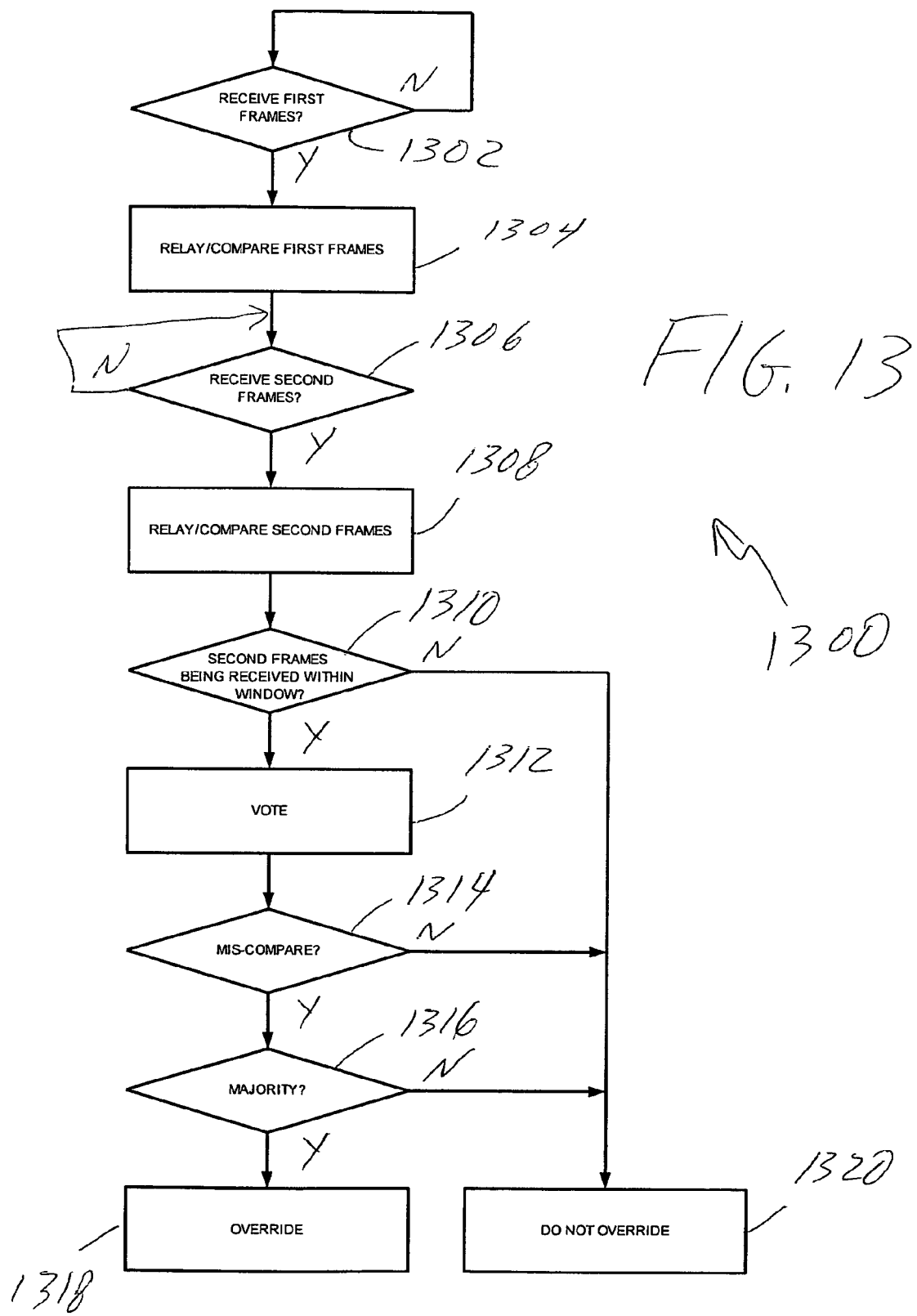
FIG. 13 is a flow diagram of one embodiment of a method of reconstituting integrity in the network of FIG. 1.

FIG. 13 is a flow diagram of one embodiment of a method of reconstituting integrity in the network 100 of FIG. 1. Although the embodiment of method 1300 shown in FIG. 13 is described here as being implemented using the network 100 shown in FIG. 1, other embodiments are implemented in other networks and in other ways. In the context of FIG. 13, the node 102 that is performing the processing of method 1300 is referred to here as the "current" node 102. In one embodiment, at least a portion of the functionality described here as being performed by the current node 102 is implemented in a controller included in the node 102. Other embodiments of method 1300 are implemented in other ways.

It is to be understood that the processing described here in connection with FIG. 13 is optional and need not necessarily be implemented in any give network 100 that any of the other systems, devices, methods or techniques described here.

Method 1300 is performed, in one embodiment, by those nodes 102 other than the transmitting node 102 and the transmitting node's clockwise and counter-clockwise neighbor nodes 102 while the nodes 102 are operating in a synchronized mode. The current node 102 is able to perform the processing of method 1300 when the current node 102 happens to receive four frames from the two channels (that is, frames from the counter-clockwise neighbor and the counter-clockwise neighbor's neighbor via channel 0 and from the clockwise neighbor and clockwise neighbor's neighbor via channel 1) within a predetermined "comparison" window. When this happens, the current node 102 is able to compare the four frames to one another in a "voting" operation.

When the current node 102 receives frames (referred to here as the "first frames") at the current node 102 from a first neighbor and a first neighbor's neighbor of the current node 102 (block 1302), the current node 102 relays one of the first frames (also referred to here as the "relayed first frame") along the that first channel and performs the two-way comparison between the two first frames in the same general manner described above in connection with FIGS. 4A-4B (block 1304). Thereafter, when the current node 102 receives frames (referred to here as the "latter" or "second" frames) at the current node 102 from the current node's other neighbor and other neighbor's neighbor (block 1306), the current node 102 relays one of the second frames (also referred to here as the "relayed second frame") along the second channel and performs the two-way comparison between the two second frames in the same general manner described above in connection with FIGS. 4A-4B (block 1308).

If the current node 102 receives the second frames from the second channel within the compare window (checked in block 1310), the current node 102 performs a voting operation using the four frames (that is, the first frames and the second frames) it is receiving (block 1312). In one embodiment, the voting operation compares each of the four frames to the other four frames in a bit-by-bit comparison. If the comparisons indicate that there is a mis-compare between the two second frames (checked in block 1314) but the first frames are identical to each other and to one of the second frames (that is, there is a "majority") (block 1316), the current node 102 "overrides" the normal relay/two-way comparison processing described above (block 1318). The current node 102, instead of performing the normal relay and two-way comparison processing described above, relays the second frame that matched the two first frames and relays along with the relayed second frame information indicating that the relayed second frame was received at the current node 102 with integrity. That is, the integrity field that would otherwise be appended to or included in the relayed second frame in accordance with the normal relay/two-war comparison processing of method 400 is replaced with a "positive" value indicating to subsequent nodes 102 that the current node 102 had a "match" (that is, received the relayed second frame with integrity) irrespective of the normal relay/two-way comparison processing performed at the current node 102. It is to be understood that in other embodiments, other voting rules and/or override processing is performed.

If the latter frames are not received within the compare window, there is no mis-compare between the second frames, or if there is a mis-compare between the second frames but there is no majority, the current node 102 does not override the normal relay/two-compare processing of the second frames (block 1320).

Figure 14:
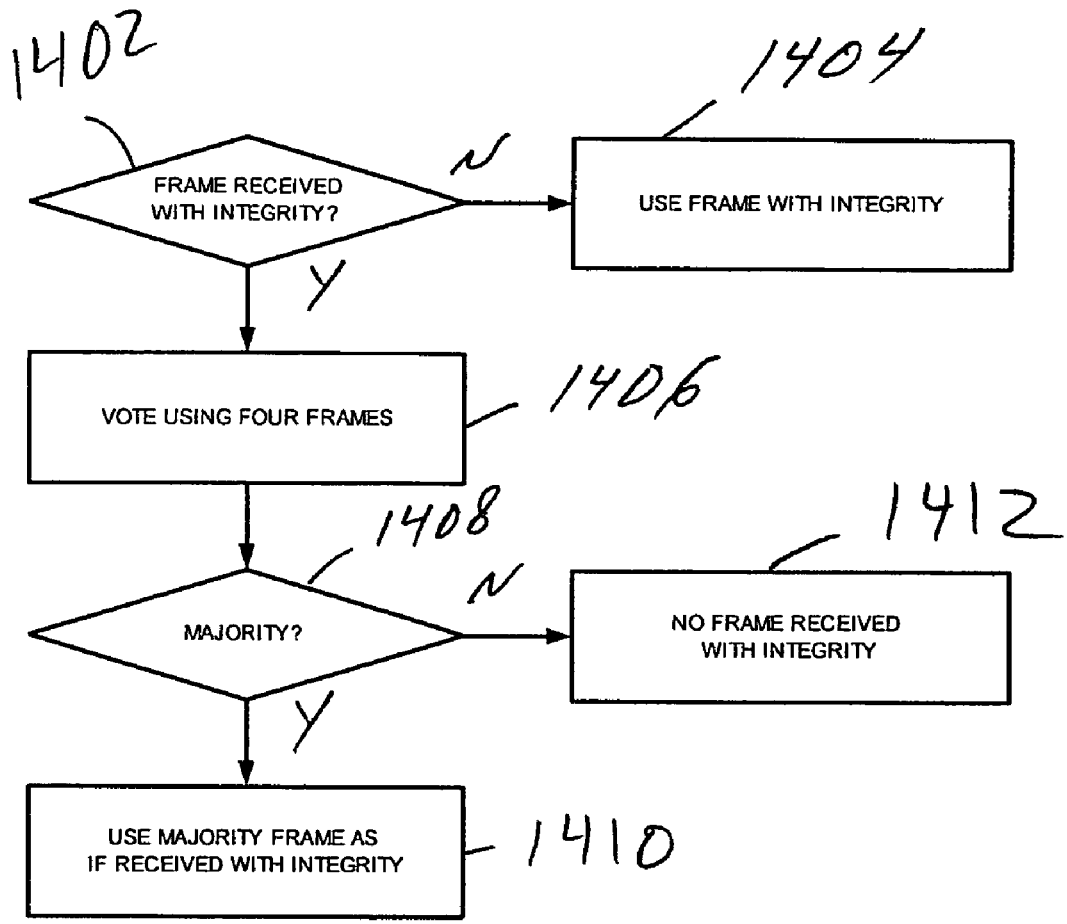
FIG. 14 is a flow diagram of one embodiment of a method of reconstituting integrity in the network of FIG. 1.

When operating in synchronized mode, a node 102 can perform such a voting operation after that node 102 has received the four frames (that is, frames from the node's clockwise neighbor, clockwise neighbor's neighbors counter-clockwise neighbor, and counter-clockwise neighbor's neighbor) for a given time slot. FIG. 14 is a flow diagram of one embodiment of a method 1400 of voting at a node 102 of the network 100 shown in FIG. 1. Although the embodiment of method 1400 shown in FIG. 14 is described here as being implemented using the network 100 shown in FIG. 1, other embodiments are implemented in other networks and in other ways. In the context of FIG. 14, the node 102 that is performing the processing of method 1400 is referred to here as the "current" node 102. In one embodiment, at least a portion of the functionality described here as being performed by the current node 102 is implemented in a "voter" that serves as an interface between the functionality that perform the transmit/relay functionality described above in connection with FIGS. 2-4B and an application executing on the node 102 that uses the data communicated over the network 100. Other embodiments of method 1400 are implemented in other ways.

Method 1400 is performed by the current node 102 when the node 102 is operating in synchronized mode and after the current node 102 has received four frames from the network 100 for a given time slot. The current node 102 determines if any of the four frames have been received at the current node 102 with integrity (block 1402). In this embodiment, a frame is received with integrity if the appended or shared integrity fields included with the frame indicate that no mismatch has occurred in the process of transmitting and relaying the frame to the current node 102. If a frame has been received at the current node 102 with integrity, that frame is used for subsequent processing (for example, by the application executing on the current node 102) (block 1404).

If none of the four frames received by the current node 102 for the current time slot were received with integrity, the current node 102 performs a voting operation using the four received frames (block 1406). The voting operation, in one embodiment, performs a bit-by-bit comparison of each frame to the other frames received on the other channel. If any of the bit-by-bit comparisons indicate that the two compared frames are identical (that is, there is a "majority") (checked in block 1408), those frames are used (for example, by the application executing on the current node 102) as if they had been received by the current node 102 with integrity (block 1410). If none of the compared frames are identical, then no frame is considered to have been received with integrity (block 412). In one embodiment, the voter within the current node 102 provides a single frame to the application executing on the current node 102 for use thereby. The frame that is provided to the application is a frame that is received with integrity at the current node or that is considered to have been received with integrity after voting. In this way, even if the relay and/or directional integrity processing described above results in four frames being received by the current node 102 without integrity, the integrity of those frames can be "reconstituted" by the voting operation.

The systems, devices, methods, and techniques described here may be implemented in networks having network topologies other than the particular braided-ring topology illustrated in FIG. 1. For example, at least some of the systems, devices, methods, and techniques described here may be implemented in networks in which additional inter-node connections are provided between the various nodes of the network. One example of such a network is a "mesh" network. In one example of such a mesh embodiment, each node is communicatively coupled to all the other nodes in the network 100 (in the case of a "full" mesh network topology) or a subset of the other nodes in the network (in the case of a "partial" mesh network topology). For each such node, and for a given flow of data within a given channel defined in such a mesh network, at least a subset of the nodes to which that node is coupled are designated as receive-from nodes for that node and at least a subset of the nodes to which that node is coupled are designated as transmit-to nodes.

Moreover, at least some of the systems, devices, methods, and techniques described here may be implemented in networks in which fewer inter-node connections are provided between the various nodes of the network. One example of such a network is a network that comprises two "simplex" ring channels. One such embodiment is implemented in a manner to that shown in FIG. 1 except that there are no skip links that communicatively couple each node to its clockwise and counter-clockwise neighbor's neighbors). For example, an embodiment of method 300 is suitable for use in such a simplex ring network.

Furthermore, it is to be understood that the various systems, devices, methods, and techniques described here need not all be implemented together in a single network and that various combinations of such systems, devices, methods, and techniques can be implemented.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A node comprising:
   an interface to communicatively couple the node to a channel;

wherein the channel communicatively couples the node to a first neighbor node in a first direction and to a second neighbor node in a second direction; and wherein, when the first neighbor node is scheduled to transmit in accordance with a transmission schedule and the node receives at least a portion of a transmission sourced from the first neighbor node via the channel, the node determines if the transmission was transmitted in accordance with the transmission schedule;

wherein if the transmission was not transmitted in accordance with the transmission schedule, the node does not relay the transmission along the channel; and wherein the node is operable to transmit data sourced from the node when scheduled to do so in the transmission schedule.

2. The node of claim 1, wherein the node relays the data if the transmission was transmitted in accordance with the transmission schedule along the channel to the second neighbor node.

3. The node of claim 1, wherein the channel communicatively couples the node to a first neighbor's neighbor node in the first direction and to a second neighbor's neighbor node in the second direction.

4. The node of claim 3, wherein the node relays the data if the transmission was transmitted in accordance with the transmission schedule along the channel to the second neighbor node and to the second neighbor's neighbor node.

5. The node of claim 1, wherein the node determines if the transmission complies with least one other policy, and wherein, if the transmission does not comply with the at least one other policy, the node does not relay the transmission along the channel.

6. The node of claim 5, wherein the at least one other policy comprises at least one of: a directional integrity policy, a semantic filtering policy, and an encoding policy.

7. A node comprising:
an interface to communicatively couple the node to a channel;
wherein the channel communicatively couples the node to a first neighbor node in a first direction and to a second neighbor node in a second direction; and
wherein, when the first neighbor node is scheduled to transmit in accordance with a transmission schedule and the node receives at least a portion of a transmission sourced from the first neighbor node via the channel, the node determines if the transmission was transmitted in accordance with the transmission schedule;
wherein if the transmission was not transmitted in accordance with the transmission schedule, the node relays the transmission along the channel with information indicating that the transmission was not transmitted in accordance with the transmission schedule; and
wherein the node is operable to transmit data sourced from the node when scheduled to do so in the transmission schedule.

8. The node of claim 7, wherein the node relays the data if the transmission was transmitted in accordance with the transmission schedule.

9. The node of claim 7, wherein the node relays the data if the transmission was transmitted in accordance with the transmission schedule along with information indicating that the transmission was transmitted in accordance with the transmission schedule.

10. The node of claim 7, wherein the channel communicatively couples the node to a first neighbor's neighbor node in the first direction and to a second neighbor's neighbor node in the second direction.

11. The node of claim 10, wherein:
the node forwards the data to the first neighbor's neighbor;
the node receives other data from the first neighbor's neighbor; and
the node compares the data to the other data in order to determine if the transmission complies with a directional integrity policy; and
the node relays the data along with information indicative of the results of the comparison along the channel to the second neighbor node and the second neighbor's neighbor node.

12. A node comprising:
an interface to communicatively couple the node to a channel;
wherein the channel communicatively couples the node to a first neighbor node in a first direction and to a second neighbor node in a second direction; and
wherein, when the first neighbor node is scheduled to transmit in accordance with a transmission schedule and the node receives at least a portion of a transmission sourced from the first neighbor node via the channel, the node determines if the transmission was transmitted in accordance with the transmission schedule;
wherein when the transmission was not transmitted in accordance with the transmission schedule, the node does at least one of:
blocks the transmission from being relayed along the channel; and
relays the transmission along the channel with information indicating that the transmission was not transmitted in accordance with the transmission schedule; and
wherein the node is operable to transmit data sourced from the node when scheduled to do so in the transmission schedule.

13. The node of claim 12, wherein the channel communicatively couples the node to a first neighbor's neighbor node in the first direction and to a second neighbor's neighbor node in the second direction.

14. The node of claim 13, wherein:
the node forwards the data to the first neighbor's neighbor;
the node receives other data from the first neighbor's neighbor; and
the node compares the data to the other data in order to determine if the transmission complies with a directional integrity policy; and
the node includes, with the transmission, information indicative of the results of the comparison and relays the transmission and the information to the second neighbor and the second neighbor's neighbor.

15. The node of claim 13, wherein the channel comprises:
a first direct link that communicatively couples the node to the first neighbor node via the channel;
a first skip link the communicatively couples the node to the first neighbor's neighbor node via the channel;
a second direct link that communicatively couples the node to the second neighbor node via the channel; and
a second skip link the communicatively couples the node to the second neighbor's neighbor node via the channel.

16. The node of claim 13, wherein the node relays the transmission by relaying the transmission to the second neighbor node and the second neighbor's neighbor node.

17. The node of claim 13, wherein the interface communicatively couples the node to a second channel, wherein the second channel communicatively couples the node to the second neighbor node and the second neighbor's neighbor in the second direction and to the first neighbor node and the first neighbor's neighbor in the first direction.

18. The node of claim 17, wherein:
when the second neighbor node is scheduled to transmit in accordance with a transmission schedule and the node receives at least a portion of a transmission sourced from the second neighbor node via the second channel, the node determines if the transmission was transmitted in accordance with the transmission schedule; and
when the transmission from the second neighbor node was not transmitted in accordance with the transmission schedule, the node does at least one of:
  block the transmission received from the second neighbor node from being relayed along the second channel; and
  relay the transmission received from the second neighbor node along the second channel with information indicating that the transmission received from the second neighbor node was not transmitted in accordance with the transmission schedule.

19. The node of claim 17, wherein the second channel comprises a ring.

20. The node of claim 17, wherein the node relays the transmission received from the second neighbor node by relaying that transmission to the first neighbor node and the first neighbor's neighbor node along the second channel.

21. The node of claim 12, wherein the node relays the transmission if the transmission was transmitted in accordance with the transmission schedule.

22. The node of claim 12, wherein the node determines if the transmission complies with least one other policy, and wherein, if the transmission does not comply with the at least one other policy, wherein the policy comprises at least one of: a temporal policy, a directional integrity policy, a semantic filtering policy, and an encoding policy.

23. The node of claim 12, wherein the node determines if the transmission complies with least one other policy, and wherein, if the transmission does not comply with the at least one other policy, wherein the policy comprises a temporal policy and, if the transmission of the data does not comply with the temporal policy, the node does not relay the transmission along the channel.

24. The node of claim 12, wherein the channel comprises a ring.

25. The node of claim 12, wherein the transmission received from the first neighbor node comprises at least one frame of data.

26. The node of claim 12, wherein the information indicating that the transmission received from the first neighbor node was not transmitted in accordance with the transmission schedule comprises at least one of an appended field that is appended to the transmission received from the first neighbor node and a shared field included in the transmission received from the first neighbor node.

27. A network comprising:
a plurality of nodes that are communicatively coupled to one another over a first channel;
wherein the channel communicatively couples each node to a first neighbor node in a first direction and to a second neighbor node in a second direction; and
wherein, for each node, when the first neighbor node of that node is scheduled to transmit in accordance with a transmission schedule and that node receives at least a portion of a transmission sourced from that first neighbor node via the channel, that node determines if the transmission was transmitted in accordance with the transmission schedule;
wherein when the transmission was not transmitted in accordance with the transmission schedule, that node does not relay the transmission along the channel; and
wherein each node is operable to transmit data sourced from that node when scheduled to do so in the transmission schedule.

28. The network of claim 27, wherein the channel communicatively couples the node to a first neighbor's neighbor node in the first direction and to a second neighbor's neighbor node in the second direction.

29. The network of claim 27, wherein the node determines if the transmission complies with least one other policy, and wherein, if the transmission does not comply with the at least one other policy, the node does not relay the transmission along the channel.

30. The network of claim 29, wherein the at least one other policy comprises one of: a directional integrity policy, a semantic filtering policy, and an encoding policy.

31. A network comprising:
a plurality of nodes that are communicatively coupled to one another over a first channel;
wherein the channel communicatively couples each node to a first neighbor node in a first direction and to a second neighbor node in a second direction; and
wherein, for each node, when the first neighbor node of that node is scheduled to transmit in accordance with a transmissions schedule and that node receives at least a portion of a transmission from that first neighbor node via the channel, that node determines if the transmission was transmitted in accordance with the transmission schedule, wherein when the transmission was not transmitted in accordance with the transmission schedule, that node relays the data along the channel with information indicating that the transmission was not transmitted in accordance with the transmissions schedule; and
wherein each node is operable to transmit data sourced from that node when scheduled to do so in the transmission schedule.

32. The network of claim 31, wherein the channel communicatively couples the node to a first neighbor's neighbor node in the first direction and to a second neighbor's neighbor node in the second direction.

33. The network of claim 32, wherein:
the node forwards the data to the first neighbor's neighbor;
the node receives other data from the first neighbor's neighbor; and
the node compares the data to the other data in order to determine if the transmission complies with a directional integrity policy; and
the node includes, with the transmission, information indicative of the results of the comparison and relays the transmission and the information to the second neighbor and the second neighbor's neighbor.

34. A network comprising:
a plurality of nodes that are communicatively coupled to one another over a first channel;
wherein the channel communicatively couples each node to a first neighbor node in a first direction and to a second neighbor node in a second direction; and
wherein, for each node, when the first neighbor node of that node is scheduled to transmit in accordance with a transmission schedule and that node receives at least a portion of a transmission from that first neighbor node via the channel, that node determines if the transmission was transmitted in accordance with the transmission schedule, wherein when the transmission was not transmitted in accordance with transmission schedule, that node does at least one of:
- block the transmission from being relayed along the channel; and
- relay the transmission along the channel with information indicating that the transmission was not transmitted in accordance with the transmission schedule; and wherein each node is operable to transmit data sourced from that node when scheduled to do so in the transmission schedule.

35. The network of claim 34, wherein the channel communicatively couples the node to a first neighbor's neighbor node in the first direction and to a second neighbor's neighbor node in the second direction.

36. The network of claim 35, wherein:
- that node forwards the data to the first neighbor's neighbor of that node;
- that node receives other data from that first neighbor's neighbor; and
- that node compares the data to the other data in order to determine if the transmission complies with a directional integrity policy; and
- that node includes, with the transmission, information indicative of the results of the comparison and relays the transmission and the information to the second neighbor node of that node and the second neighbor's neighbor node of that node.

37. The network of claim 35, wherein the channel comprises, for each node:
- a first direct link that communicatively couples that node to the first neighbor node of that node via the channel;
- a first skip link the communicatively couples that node to the first neighbor's neighbor node of that node via the channel;
- a second direct link that communicatively couples that node to the second neighbor node of that node via the channel; and
- a second skip link the communicatively couples that node to the second neighbor's neighbor node of that node via the channel.

38. The network of claim 35, wherein that node relays the transmission by relaying the transmission to the second neighbor node of that node and the second neighbor's neighbor node of that node.

39. The network of claim 35, wherein a second channel communicatively couples each node to the second neighbor node of that node and the second neighbor's neighbor node of that node in the second direction and to the first neighbor node of that node and the first neighbor's neighbor node of that node in the first direction.

40. The network of claim 39, wherein:
- when the second neighbor node is scheduled to transmit in accordance with the transmission schedule and the node receives at least a portion of a transmission from the second neighbor node via the second channel, the node determines if the transmission was transmitted in accordance with the transmission schedule; and
- when the transmission received from the second neighbor node was not transmitted in accordance with the transmission schedule, the node does at least one of:
  - blocks the transmission received from the second neighbor node from being relayed along the second channel; and
  - relays the transmission received from the second neighbor node along the second channel with information indicating that the transmission received from the second neighbor node was not transmitted in accordance with the transmission schedule.

41. The network of claim 39, wherein the second channel comprises a ring.

42. The network of claim 39, wherein the node relays the transmission received from the second neighbor node by relaying that transmission to the first neighbor node and the first neighbor's neighbor node along the second channel.

43. The network of claim 34, wherein the node determines if the transmission complies with least one other policy, and wherein, if the transmission does not comply with the at least one other policy, wherein the policy comprises at least one of: a temporal transmission policy, a directional integrity policy, a semantic filtering policy, and an encoding policy.

44. The network of claim 34, wherein the node determines if the transmission complies with least one other policy, and wherein, if the transmission does not comply with the at least one other policy, wherein the policy comprises a temporal transmission policy and, if the data received by that node for that first neighbor node does not comply with the temporal transmission policy, that node does not relay the transmission along the channel.

45. The network of claim 34, wherein the channel comprises a ring.

46. The network of claim 34, wherein the transmission received from that first neighbor node comprises at least one frame of data.

47. The network of claim 34, wherein the information indicating that the transmission received from that first neighbor node was not transmitted in accordance with the transmission schedule comprises at least one of an appended field that is appended to the transmission received from that first neighbor node and a shared field included in the transmission received from that first neighbor node.

48. A method of communicating in a network comprising a plurality of nodes that are communicatively coupled to one another over at least a channel, the method comprising:
at each node:
- determining when a first neighbor node of that node is scheduled to transmit on the channel in accordance with a transmission schedule;
- when the first neighbor node of that node is scheduled to transmit on the channel:
  - receiving at least a portion of a transmission transmitted by the first neighbor node of that node;
  - determining if the transmission was transmitted in accordance with the transmission schedule;
  - if the transmission was not transmitted in accordance with the transmission schedule:
    - blocking the transmission from being relayed along the channel; and
    - relaying the transmission along the channel with information indicating that the transmission was not transmitted in accordance with the transmission schedule; and
  - if the transmission was transmitted in accordance with the transmission schedule, relaying the transmission along the channel; and
- determining when that node is scheduled to transmit data sourced from that node in accordance with the transmission schedule; and
- when that node is scheduled to transmit data sourced from that node in accordance with the transmission schedule, transmitting data sourced from that node.

49. A node comprising:
means for communicatively coupling the node to a channel, where the channel communicatively couples the node to a first neighbor node in a first direction and to a second neighbor node in a second direction;

means for determining when the first neighbor node is scheduled to transmit in accordance with a transmission schedule;

means for receiving at least a portion of transmission transmitted by the first neighbor node when the first neighbor node is scheduled to transmit:

means for determining if the transmission was transmitted in accordance with the transmission schedule;

means for doing at least one of the following if the transmission was not transmitted in accordance with the transmission schedule:

blocking the transmission from being relayed along the channel; and relaying the transmission along the channel with information indicating that the transmission was not transmitted in accordance with the transmission schedule; and means for relaying the transmission along the channel if the transmission was transmitted in accordance with the transmission schedule; and means determining when that node is scheduled to transmit data sourced from that node in accordance with the transmission schedule; and means transmitting data sourced from that node when that node is scheduled to do so.

50. A node comprising:

an interface to communicatively couple the node to a channel, wherein the channel communicatively couples the node to a plurality of receive-from nodes from which the node receives data on the channel;

wherein one of the receive-from nodes is a primary receive-from node;

wherein, when the primary receive-from node is scheduled to transmit in accordance with a transmission schedule and the node receives data from the primary receive-from node via the channel, the node determines if the transmission of the data was done in accordance with the transmission schedule;

wherein when the transmission of the data was not done in accordance with the transmission schedule, the node does at least one of:

blocking the data from being relayed along the channel; and relaying the data along the channel with information indicating that the transmission of the data was not done in accordance with the transmission schedule; and wherein when the transmission of the data was net done in accordance with the transmission schedule, the node relays the data along the channel; and wherein the node is operable to transmit data sourced from the node when scheduled to do so in the transmission schedule.

51. The node of claim 50, wherein the channel is formed in at least one of a mesh and a ring.

52. The node of claim 50, wherein the channel communicatively couples the node to a plurality of transmit-to nodes and wherein, when the node relays the date along the channel, the node relays the data to the plurality of transmit-to nodes.

53. The node of claim 50, wherein the interface couples the node to a plurality of channels.

\* \* \* \* \*